United States Patent
Onoda et al.

(10) Patent No.: US 7,722,450 B2
(45) Date of Patent: May 25, 2010

(54) GAME SYSTEM, PROGRAM, AND INFORMATION STORAGE MEDIUM

(75) Inventors: Hiroyuki Onoda, Yokohama (JP); Hiroumi Endo, Adachi (JP); Hiroshi Igarashi, Yokohama (JP); Junji Takamoto, Kyoto (JP); Takeshi Nagareda, Kyoto (JP)

(73) Assignees: Namco Bandai Games Inc., Tokyo (JP); Nintendo Co., Ltd., Kyoto-shi (JP)

( * ) Notice: Subject to any disclaimer, the term of this patent is extended or adjusted under 35 U.S.C. 154(b) by 965 days.

(21) Appl. No.: 10/936,589

(22) Filed: Sep. 9, 2004

(65) Prior Publication Data

US 2005/0085284 A1 Apr. 21, 2005

(30) Foreign Application Priority Data

Sep. 12, 2003 (JP) ............................. 2003-321947

(51) Int. Cl.
*A63F 9/22* (2006.01)
(52) U.S. Cl. .................. 463/7; 463/23; 463/43
(58) Field of Classification Search ............ 463/7, 463/1, 23, 35, 43
See application file for complete search history.

(56) References Cited

U.S. PATENT DOCUMENTS

| | | | | |
|---|---|---|---|---|
| 6,379,244 B1* | 4/2002 | Sagawa et al. | ............. | 463/7 |
| 6,390,923 B1* | 5/2002 | Yoshitomi et al. | ............. | 463/43 |
| 6,645,067 B1* | 11/2003 | Okita et al. | ............. | 463/7 |
| 6,905,413 B1* | 6/2005 | Terao et al. | ............. | 463/40 |
| 2002/0005109 A1* | 1/2002 | Miller | ............. | 84/609 |
| 2002/0025842 A1* | 2/2002 | Nobe et al. | ............. | 463/7 |
| 2002/0118562 A1* | 8/2002 | Hiratsuka | ............. | 365/1 |

FOREIGN PATENT DOCUMENTS

| | | |
|---|---|---|
| JP | A 11-313979 | 11/1999 |
| JP | A 2000-218046 | 8/2000 |
| JP | A 2000-237455 | 9/2000 |
| JP | A 2001-246167 | 9/2001 |
| JP | A 2001-293246 | 10/2001 |
| JP | A 2002-239222 | 8/2002 |

OTHER PUBLICATIONS

Mavis Beacon Teaches Typing, The Riverdeep Learning Company, User Guide, Copyright 2001, pp. 31, 35.*
U.S. Appl. No. 10/935,181, filed Sep. 8, 2004, Hiroyuki Onoda et al.
U.S. Appl. No. 10/936,592, filed Sep. 9, 2004, Hiroyuki Onoda et al.
U.S. Appl. No. 10/936,579, filed Sep. 9, 2004, Hiroyuki Onoda et al.

* cited by examiner

*Primary Examiner*—Peter DungBa Vo
*Assistant Examiner*—Omkar Deodhar
(74) *Attorney, Agent, or Firm*—Oliff & Berridge, PLC

(57) ABSTRACT

A game system including: a music reproduction section which reproduces given music data stored in a storage section; a display control section which performs display control of changing a relative positional relationship among a direction mark which directs an operation to be performed by a player using an operation section, a special direction mark for the second game and a reference mark for timing judgment of the operation in association with a reproduction state of the music data to cause the direction mark and the reference mark to come closer; a timing acquisition section which acquires operation timing when the player operates the operation section for the direction mark; and a game calculation section which performs calculation processing of a first game of comparing the acquired operation timing with timing criteria and calculation processing of a second game differing from the first game based on operation information of the operation section for the special direction mark.

18 Claims, 20 Drawing Sheets

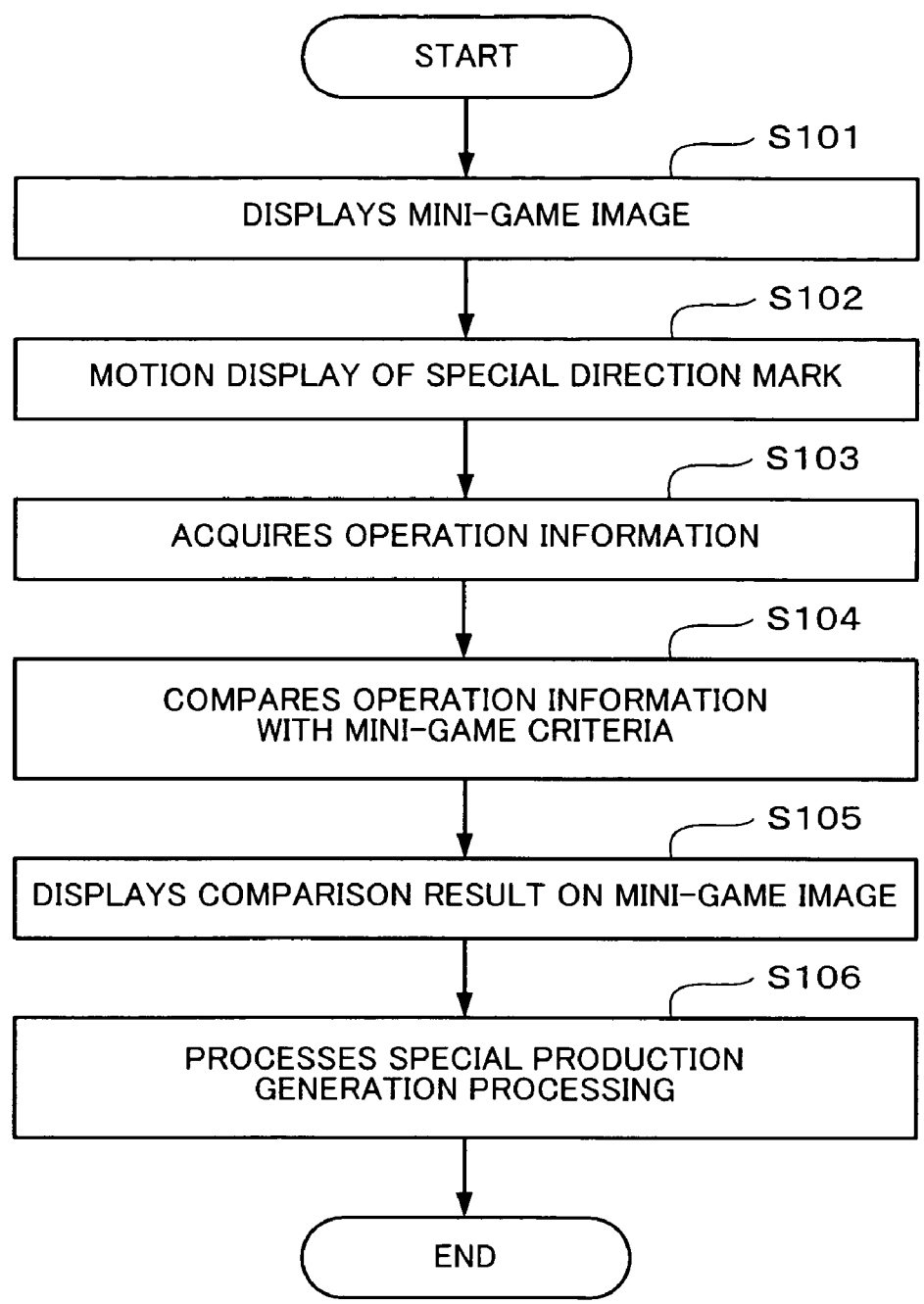

GAME SYSTEM, PROGRAM, AND INFORMATION STORAGE MEDIUM

Japanese Patent Application No. 2003-321947, filed on Sep. 12, 2003, is hereby incorporated by reference in its entirety.

BACKGROUND OF THE INVENTION

The present invention relates to a game system, a program, and an information storage medium.

Conventionally, a music game which allows a player to perform an operation input in association with reproduction of music and evaluates the operation input has been known. Such a music game is generally evaluated by the operation input timing.

However, when the player makes progress in the operation skill, the operation input in exact timing becomes complicated, whereby the player loses interest in the game. Therefore, a technology which improves playability of the music game has been demanded.

BRIEF SUMMARY OF THE INVENTION

According to a first aspect of the present invention, there is provided a program for a game in which a player plays by operating an operation section, the program causing a computer to function as:

a music reproduction section which reproduces given music data stored in a storage section;

a display control section which performs display control of changing a relative positional relationship between a direction mark which directs an operation to be performed by a player using an operation section and a reference mark for timing judgment of the operation in association with a reproduction state of the music data to cause the direction mark and the reference mark to come closer;

a timing acquisition section which acquires operation timing when the player operates the operation section for the direction mark; and a game calculation section which performs calculation processing of a first game of comparing the acquired operation timing with timing criteria and calculation processing of a second game differing from the first game, wherein the display control section performs control of displaying a special direction mark for the second game as at least one of the direction marks; and wherein, when an operation of the operation section has been performed within a period in which the special direction mark overlaps the reference mark, the game calculation section performs the calculation processing of the second game based on operation information of the operation section for the special direction mark.

According to a second aspect of the present invention, there is provided a program for a percussion instrument game in which a player plays by performing an operation of beating a percussion instrument type controller, the program causing a computer to function as:

a music reproduction section which reproduces music data for playing a percussion instrument which is stored in a storage section;

a display control section which performs display control of changing a relative positional relationship between a direction mark which directs a beat operation to be performed by a player using a percussion instrument type controller and a reference mark for timing judgment of the beat operation in association with a reproduction state of the music data to cause the direction mark and the reference mark to come closer;

a timing acquisition section which acquires beat timing when the player performs the beat operation of the percussion instrument type controller for the direction mark; and a game calculation section which performs calculation processing of a first game of comparing the acquired beat timing with timing criteria and evaluating the beat operation of the player, and calculation processing of a second game differing from the first game, wherein the display control section performs control of displaying a special direction mark for the second game as at least one of the direction marks;

wherein, when an operation of the percussion instrument type controller has been performed within a period in which the special direction mark overlaps the reference mark, the game calculation section performs the calculation processing of the second game based on the beat timing of the percussion instrument type controller for the special direction mark; and wherein the game calculation section performs processing of causing a result of the calculation processing of the second game to be reflected in the first game by performing special production for the first game.

According to a third aspect of the present invention, there is provided a computer-readable information storage medium, which stores any of the above-described programs.

According to a fourth aspect of the present invention, there is provided a game method for a game in which a player plays by operating an operation section, the method comprising:

reproducing given music data stored in a storage section;

performing display control of changing a relative positional relationship between a direction mark which directs an operation to be performed by a player using an operation section and a reference mark for timing judgment of the operation in association with a reproduction state of the music data to cause the direction mark and the reference mark to come closer;

acquiring operation timing when the player operates the operation section for the direction mark;

performing calculation processing of a first game of comparing the acquired operation timing with timing criteria and calculation processing of a second game differing from the first game;

performing control of displaying a special direction mark for the second game as at least one of the direction marks; and performing the calculation processing of the second game based on operation information of the operation section for the special direction mark, when an operation of the operation section has been performed within a period in which the special direction mark overlaps the reference mark.

According to a fifth aspect of the present invention, there is provided a game method for a percussion instrument game in which a player plays by performing an operation of beating a percussion instrument type controller, the method comprising:

reproducing music data for playing a percussion instrument which is stored in a storage section;

performing display control of changing a relative positional relationship between a direction mark which directs a beat operation to be performed by a player using a percussion instrument type controller and a reference mark for timing judgment of the beat operation in association with a reproduction state of the music data to cause the direction mark and the reference mark to come closer;

acquiring beat timing when the player performs the beat operation of the percussion instrument type controller for the direction mark;

performing calculation processing of a first game of comparing the acquired beat timing with timing criteria and evaluating the beat operation of the player, and calculation processing of a second game differing from the first game;

performing control of displaying a special direction mark for the second game as at least one of the direction marks;

performing the calculation processing of the second game based on the beat timing of the percussion instrument type controller for the special direction mark, when an operation of the percussion instrument type controller has been performed within a period in which the special direction mark overlaps the reference mark; and performing processing of causing a result of the calculation processing of the second game to be reflected in the first game by performing special production for the first game.

BRIEF DESCRIPTION OF THE SEVERAL VIEWS OF THE DRAWING

FIG. 20 is a flowchart showing a processing example according to one embodiment of the present invention.

DETAILED DESCRIPTION OF THE EMBODIMENTS

Figure 1:
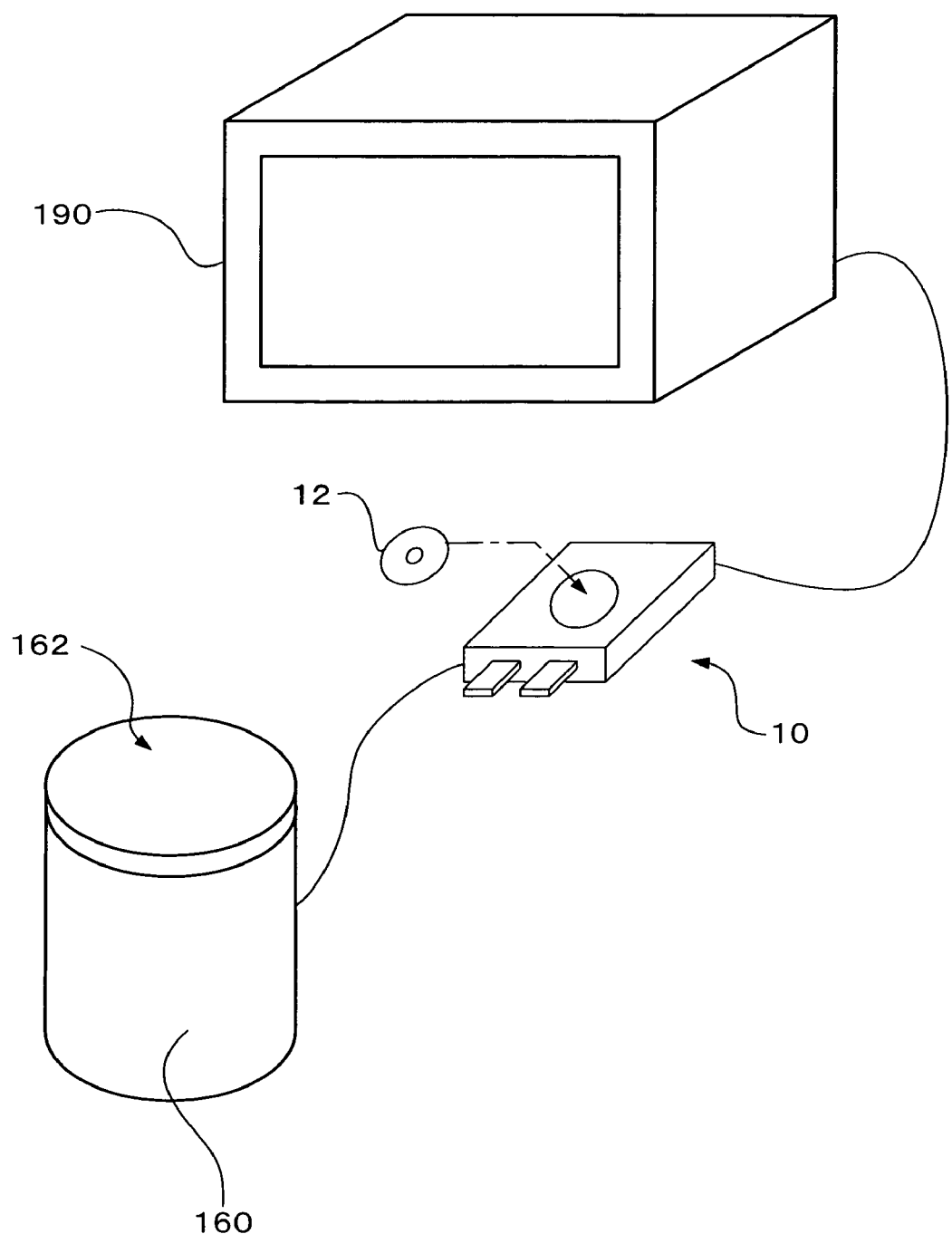
FIG. 1 is a diagram showing a game system according to one embodiment of the present invention.

Embodiments of the present invention has been achieved in view of the above-described situation and may provide a game system, a program, and an information storage medium which can improve playability of a music game and can attract the interest of a player for a long period of time.

According to one embodiment of the present invention, there is provided a game system for a game in which a player plays by operating an operation section, the system including:

a music reproduction section which reproduces given music data stored in a storage section;

a display control section which performs display control of changing a relative positional relationship between a direction mark which directs an operation to be performed by a player using an operation section and a reference mark for timing judgment of the operation in association with a reproduction state of the music data to cause the direction mark and the reference mark to come closer;

a timing acquisition section which acquires operation timing when the player operates the operation section for the direction mark; and a game calculation section which performs calculation processing of a first game of comparing the acquired operation timing with timing criteria and calculation processing of a second game differing from the first game, wherein the display control section performs control of displaying a special direction mark for the second game as at least one of the direction marks; and wherein, when an operation of the operation section has been performed within a period in which the special direction mark overlaps the reference mark, the game calculation section performs the calculation processing of the second game based on operation information of the operation section for the special direction mark.

According to one embodiment of the present invention, there is provided a program causing a computer to function as the above-described components. According to one embodiment of the present invention, there is provided an information storage medium storing a program causing a computer to function as the above-described components.

In these embodiments, the relative positional relationship between the direction mark and the special direction mark (direction mark for executing the calculation processing of the second game) and the reference mark is changed in association with reproduction of the music data. The direction mark and the special direction mark are displayed so as to approach the reference mark. When the player performs an operation input for the direction mark, the operation input timing is compared with the timing criteria, whereby the calculation of the first game is performed. When the player performs an operation input for the special direction mark which is displayed as at least one of the direction marks, the calculation of the second game differing from the first game is performed based on the operation information. It suffices that the second game should just be a game which allows a predetermined operation input to be completed within a period in which the special direction mark overlaps the reference mark in a broad sense (period in which the special direction mark passes through the reference mark). As the second game, various games such as a slot game in which symbols displayed in a moving state are stopped, a batting game which allows a player to hit a ball, and a Janken game can be given. Since the calculation processing of the second game is performed based on the operation information for the special direction mark, the player must perform the operation input for the special direction mark while taking the result of the second game into consideration in addition to the operation input for the direction mark for the first game as in a conventional game. Therefore, a music game with higher playability in comparison with a conventional music game can be implemented, whereby it is possible to attract the interest of the player for a long period of time.

In each of the above game system, program and information storage medium, the game calculation section may perform the calculation processing of the second game based on the operation timing of the operation section as the operation information of the operation section for the special direction mark. This enables the second game to be performed by the operation at the same timing as the timing at which the player performs the operation for the first game. Therefore, since the operation for the second game is not complicated even for an inexperienced player, it is possible to attract the interest of a wide range of players.

In each of the above game system, program and information storage medium, the game calculation section may perform the calculation processing of the first game by comparing the operation timing of the operation section for the special direction mark with the timing criteria. Since this enables the player to perform the operation input for both the first and second games by merely performing the operation input performed in the first game for the direction mark, the operation input is not complicated, whereby an inexperienced player can enjoy a music game with high playability.

In each of the above game system, program and information storage medium, the game calculation section may perform the calculation processing of the first game by comparing the operation timing of the operation section for the special direction mark with first timing criteria, and perform the calculation processing of the second game by comparing the operation timing with second timing criteria differing from the first timing criteria. This enables different calculation processing results (evaluation) to be obtained for the operation timing of the operation performed for the special direction mark between the first game and the second game. Therefore, strategic properties of the game can be increased by allowing the player to judge whether to perform the operation input for the special direction mark while attaching importance to either the result of the first game or the result of the second game. Therefore, an advanced music game in which the intention of the player is reflected when allowing the player to play the second game can be implemented.

In each of the above game system, program and information storage medium, the game calculation section may perform processing of causing a result of the calculation processing of the second game to be reflected in the first game by performing special production corresponding to the result of the second game for the first game. As the special production performed in the first game corresponding to the result of the second game, addition or subtraction of points to or from the score, assignment of items, change in display content of the game image, change in game parameter relating to the first game, and the like can be given. When the first game is a competition game, production which hinders play of the competitor may be performed as special production. Therefore, game production which rarely causes a player who has an improved operation skill of the first game to lose interest can be provided by causing the result of the second game to be reflected in the first game.

In each of the above game system, program and information storage medium, the game calculation section may perform the calculation processing of the second game based on a number of operations, an operation period, or an operation strength of the operation section as the operation information of the operation section for the special direction mark. This enables the type of a game performed as the second game to be employed from various games.

In each of the above game system, program and information storage medium, the display control section may perform control of displaying a game content of the second game on the special direction mark. Especially, when the game calculation section has performed the calculation processing of the second game based on the operation timing of the operation section, the display control section may perform control of displaying a result of the calculation processing of the second game on the special direction mark. This enables the player to perform an operation input for the second game relating to the special direction mark from the same viewpoint as the viewpoint when performing an operation input for the normal direction mark. Therefore, since movement of the viewpoint of the player can be reduced, even an inexperienced player can enjoy a game play without performing a complicated operation input.

In each of the above game system, program and information storage medium, when the operation section has been operated for all of a plurality of the special direction marks, the game calculation section may perform processing of causing a result of the calculation processing of the second game to be reflected in the first game. Since this prevents the calculation processing result of the second game from being reflected in the first game until the player finishes the operation input for all the special direction marks, expectation of the player for the calculation processing result of the second game can be changed as the operation input progresses, whereby the second game can be provided with higher strategic properties.

In each of the above game system, program and information storage medium, the display control section may perform control of displaying the special direction mark corresponding to a progress state of the first game. This allows the player to expect the appearance of the special direction mark, whereby a game which does not cause the player to lose interest can be implemented in comparison with the case of causing the special direction mark to appear periodically.

In each of the above game system, program and information storage medium, the display control section may perform control of displaying a game start direction mark for allowing the second game to be performed by causing the special direction mark to appear as at least one of the direction marks. Since the player cannot perform the second game until the player performs an operation input for the game start direction mark, the player is allowed to determine whether or not to perform the second game, whereby strategic properties of the game can be increased. In particular, since the player recognizes that the second game accidentally occurs by displaying the game start direction mark in the same display state as the normal direction mark, expectation of the player for the appearance of the special direction mark can be further increased.

In each of the above game system, program and information storage medium, the game calculation section may cause an acceptance period for an operation input for the second game to be started on condition that a predetermined operation using the operation section has been performed within a period in which the special direction mark overlaps the reference mark, and perform the calculation processing of the second game based on the operation information of the operation section within the acceptance period. According to this feature, the acceptance period of the operation input of the second game differs corresponding to the period of time until the player performs the predetermined operation input. Therefore, since the player becomes more tense for the operation input of the second game, playability which does not cause the player to lose interest can be added to the music game by the second game.

In each of the above game system, program and information storage medium, the first game may be a competition game in which a plurality of players compete for a comparison result between the operation timing of the operation section and the timing criteria; and when a given player has performed an operation of the operation section for the special direction mark, the game calculation section may perform processing of causing a result of the calculation processing of the second game based on the operation information performed by the player to be reflected in the first game performed by another player. According to this feature, in the case where the first game is a competition game, the player can strategically proceed with the first game by performing the second game while watching the state of the competitor, whereby the players can enjoy an exciting competition game.

In the above game system, the first game may be a competition game in which a plurality of players compete for a comparison result between the operation timing of the operation section and the timing criteria; the game system may further include a monitoring section which monitors a competition state of the first game between or among the plurality of players; and when the monitoring section judges that a given player is in a disadvantageous competition state in comparison with another player, the display control section may perform control of displaying the special direction mark for the player in the disadvantageous competition state.

In each of the above program and information storage medium, the first game may be a competition game in which a plurality of players compete for a comparison result between the operation timing of the operation section and the timing criteria; the computer may be caused to function as a monitoring section which monitors a competition state of the first game between or among the plurality of players; and when the monitoring section judges that a given player is in a disadvantageous competition state in comparison with another player, the display control section may perform control of displaying the special direction mark for the player in the disadvantageous competition state.

This prevents the competition result from becoming one-sided even when an inexperienced player and a highly experienced player play in competition, whereby an exciting competition game can be implemented.

In the above game system, the first game may be a competition game in which a plurality of players compete for a comparison result between the operation timing of the operation section and the timing criteria; the game system may further include a condition judgment section which judges whether the operation information of the operation section for the special direction mark satisfies a predetermined condition of the second game; and when the condition judgment section has judged that the operation information of the operation section of a given player for the special direction mark does not satisfy the predetermined condition of the second game, the display control section may perform control of displaying the special direction mark for another player.

In each of the above program and information storage medium, the first game may be a competition game in which a plurality of players compete for a comparison result between the operation timing of the operation section and the timing criteria; the computer may be caused to function as a condition judgment section which judges whether the operation information of the operation section for the special direction mark satisfies a predetermined condition of the second game; and when the condition judgment section has judged that the operation information of the operation section of a given player for the special direction mark does not satisfy the predetermined condition of the second game, the display control section may perform control of displaying the special direction mark for another player.

This allows each player to eagerly play the second game by alternately giving the opportunity of performing the second game to the players, whereby an exciting competition game can be implemented.

According to one embodiment of the present invention, there is provided a game system for a percussion instrument game in which a player plays by performing an operation of beating a percussion instrument type controller, the system including:

a music reproduction section which reproduces music data for playing a percussion instrument which is stored in a storage section;

a display control section which performs display control of changing a relative positional relationship between a direction mark which directs a beat operation to be performed by a player using a percussion instrument type controller and a reference mark for timing judgment of the beat operation in association with a reproduction state of the music data to cause the direction mark and the reference mark to come closer;

a timing acquisition section which acquires beat timing when the player performs the beat operation of the percussion instrument type controller for the direction mark; and a game calculation section which performs calculation processing of a first game of comparing the acquired beat timing with timing criteria and evaluating the beat operation of the player, and calculation processing of a second game differing from the first game, wherein the display control section performs control of displaying a special direction mark for the second game as at least one of the direction marks;

wherein, when an operation of the percussion instrument type controller has been performed within a period in which the special direction mark overlaps the reference mark, the game calculation section performs the calculation processing of the second game based on the beat timing of the percussion instrument type controller for the special direction mark; and wherein the game calculation section performs processing of causing a result of the calculation processing of the second game to be reflected in the first game by performing special production for the first game.

According to one embodiment of the present invention, there is provided a program causing a computer to function as the above-described components. According to one embodiment of the present invention, there is provided an information storage medium storing a program causing a computer to function as the above-described components.

In these embodiments, since the calculation processing of the second game is performed based on the timing of the beat operation of the percussion instrument type controller for the special direction mark, the player must perform the beat operation of the percussion instrument type controller while taking the result of the second game into consideration in addition to the beat operation merely in exact timing for the first game. Therefore, a music game with higher playability in comparison with a conventional music game can be implemented, whereby it is possible to attract the interest of the player for a long period of time. Moreover, playability is improved by causing the result of the calculation processing of the second game to be reflected in the first game, whereby game production which rarely causes a player who has an improved operation skill of the first game to lose interest can be achieved.

These embodiments of the present invention will be described below with reference to the drawings. Note that the present invention is not limited to the embodiments described below and various modifications can be made within the scope of the invention.

FIG. 1 shows a game system in one embodiment of the present invention. The game system includes an operation section 160 (percussion instrument type controller) which imitates the shape of a percussion instrument such as a drum, a main device 10 (game device), and a display section 190. The operation section 160 includes an operation region 162, and a player performs an operation input by beating the operation region 162 by hand, for example. A sensor (not shown) corresponding to the operation region 162 is provided inside the operation section 160, and an operation input by the player can be detected by using the sensor.

The main device 10 performs game processing based on operation data from the operation section 160 and a program stored in an information storage medium 12 (CD, DVD, or the like) to generate a game image and game sound. The generated game image is displayed in the display section 190.

In FIG. 1, the operation section 160 and the main device 10 (image generation device) are separately provided. However, the game system may have a configuration in which the main device 10 (game processing section or image generation section) is provided in the operation section 160. In this case, the operation section 160 (game controller) is directly connected with the display section 190, and a game image is displayed in the display section 190. FIG. 1 shows a consumer game device as an example. However, the present invention may be applied to an arcade game device.

Figure 2:
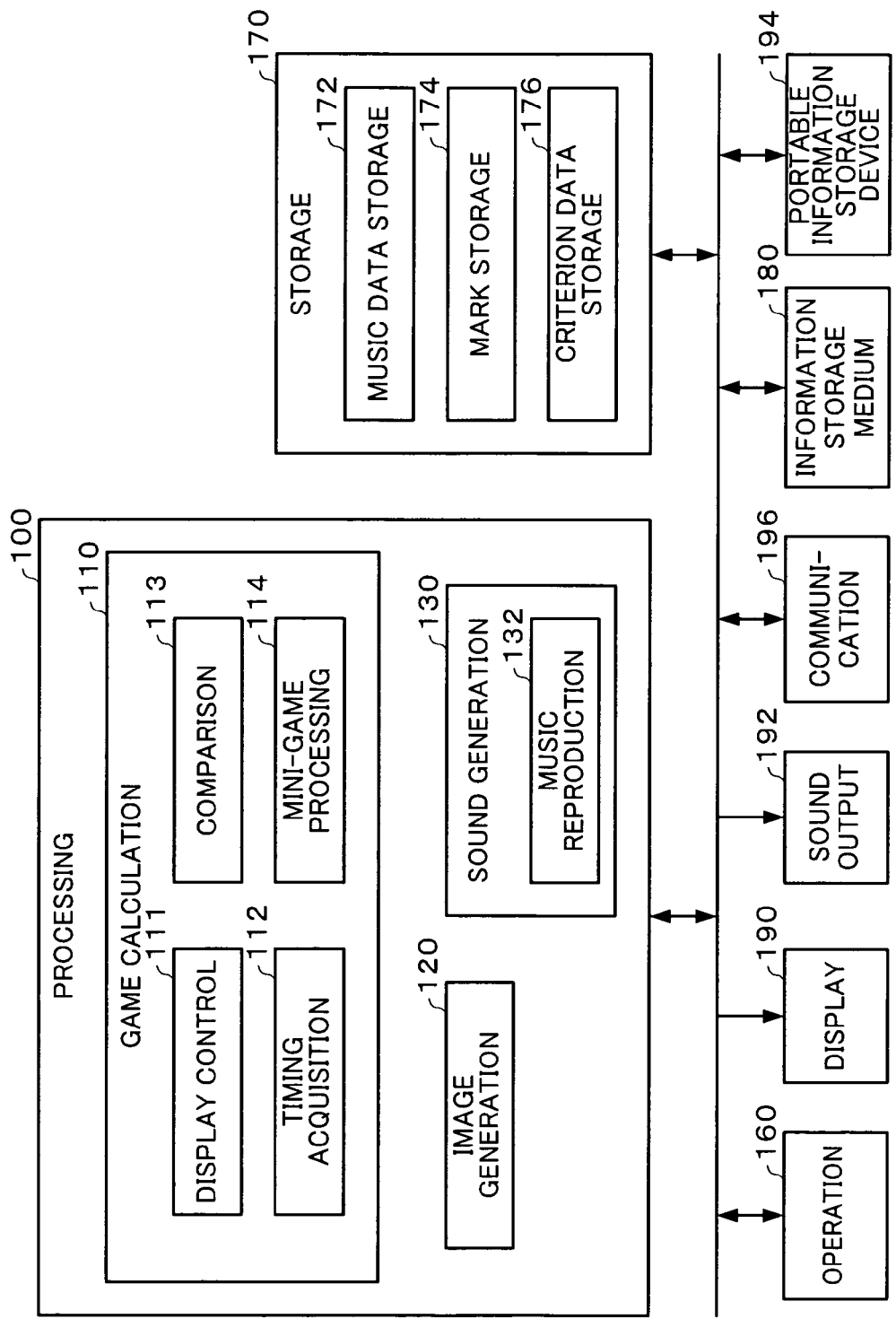
FIG. 2 is a functional block diagram showing a game system according to one embodiment of the present invention.

FIG. 2 shows a functional block diagram of the game system (image generation system) in one embodiment of the present invention. The game system of this embodiment does not necessarily include all of the components (each section) shown in FIG. 2. The game system may have a configuration in which some of the components are omitted. A music game (first game in a broad sense) implemented by the game system (program) of this embodiment is a game in which a player plays music using an operation section which imitates a musical instrument, a game in which a player dances to music, or the like.

The operation section 160 allows a player to input operation data. The function of the operation section 160 may be implemented by hardware such as a controller which imitates a percussion instrument as shown in FIG. 1, an operation button, an operation lever, or a voice input microphone. A storage section 170 provides a work area for a processing section 100, a communication section 196, and the like. The function of the storage section 170 may be implemented by hardware such as a RAM.

An information storage medium 180 (computer-readable medium) stores a program, data, and the like. The function of the information storage medium 180 may be implemented by hardware such as an optical disk (CD or DVD), a magneto-optical disk (MO), a magnetic disk, a hard disk, a magnetic tape, or a memory (ROM). The processing section 100 performs various types of processing of this embodiment based on a program (data) stored in the information storage medium 180. Specifically, a program for causing a computer to function as each section of this embodiment (program for causing a computer to execute processing of each section) is stored in the information storage medium 180.

The display section 190 outputs an image generated by this embodiment. The function of the display section 190 may be implemented by hardware such as a CRT, an LCD, a touch panel type display, or a head mount display (HMD). A sound output section 192 outputs sound generated by this embodiment. The function of the sound output section 192 may be implemented by hardware such as a speaker or a headphone. A portable information storage device 194 stores player's personal data, game save data, and the like. As the portable information storage device 194, a memory card, a portable game device, and the like can be given. The communication section 196 performs various types of control for communicating with the outside (host device or other game system, for example). The function of the communication section 196 may be implemented by hardware such as various processors or a communication ASIC, or by a program.

A program (data) for causing a computer to function as each section of this embodiment may be distributed to the information storage medium 180 (storage section 170) from an information storage medium included in a host device (server) through a network and the communication section 196. Use of the information storage medium of the host device (server) may be included within the scope of the present invention.

The processing section 100 (processor) performs various types of processing such as game processing, image generation processing, or sound generation processing based on operation data from the operation section 160, a program, and the like. As the game processing performed by the processing section 100, processing of starting a game when a game start condition is satisfied, processing of proceeding with a game, processing of disposing a display object (object) such as a direction mark or a character, processing of displaying a display object, processing of calculating a game result, processing of terminating a game when a game end condition is satisfied, and the like can be given. The processing section 100 performs various types of processing using the storage section 170 as a work area. The function of the processing section 100 may be implemented by hardware such as various processors (CPU, DSP, or the like) or ASIC (gate array or the like), or by a program (game program).

The processing section 100 includes a game calculation section 110 (display control section 111, timing acquisition section 112, comparison section 113, and mini-game processing section 114), an image generation section 120, and a sound generation section 130. The processing section 100 may have a configuration in which some of these sections are omitted.

The display control section 111 performs display control of a plurality of display objects including a direction mark (note mark) and a reference mark. In more detail, the display control section 111 performs processing of disposing a display object, processing of moving a display object, processing of changing an image of a display object, and the like. The direction mark is a mark for directing an operation to be performed by a player using the operation section 160, and image data of the direction mark is stored in a mark storage section 174 of the storage section 170. The reference mark (reference position) is a mark (position) which indicates a reference timing for mainly evaluating operation timing of a player to the player, and image data of the reference mark is also stored in the mark storage section 174 of the storage section 170. The display control section 111 also performs control of displaying a special direction mark for performing a mini-game (second game in a broad sense) executed in the music game as at least one of the direction marks.

The timing acquisition section 112 performs processing of acquiring the operation timing of the player when the player operates the operation section 160 according to the direction of the direction mark (when the player plays the percussion instrument). In more detail, the timing acquisition section 112 monitors and acquires the operation data from the operation section 160 in frame units. The timing acquisition section 112 performs processing of storing the acquired operation data in a given storage buffer. The frame (1/60 or 1/30 sec, for example) is a time unit for performing game processing (movement-motion processing of display object) or image generation processing.

The comparison section 113 compares the operation timing acquired by the timing acquisition section 112 with timing criteria for evaluating the music game, and evaluates the operation of the player based on the comparison result. In more detail, data of the timing criteria including the reference timing as a model is stored in a criterion data storage section 176 of the storage section 170. The comparison section 113 performs processing of reading the stored data of the timing criteria, comparing the acquired operation timing with the timing criteria, and judging the degree of coincidence between the operation timing and the reference timing or judging the degree of difference between the operation timing and the reference timing.

In this embodiment, the display control section 111 performs control of displaying the reference mark corresponding to the reference timing and the direction mark which directs the player to operate the operation region 162 of the operation section 160 in association with reproduction (reproduction state) of music data. When the player operates the operation region 162 of the operation section 160 according to the direction of the direction mark, the comparison section 113 compares the operation timing of the operation region 162 with the timing criteria, evaluates the operation of the player based on the comparison result, and calculates the score of the player or the like. The representation "the direction mark is displayed in association with reproduction (reproduction state) of music data" means that movement display of various direction marks is started when reproduction of music data (output of music data) is started, and the movement display is finished when the reproduction of music data is finished. The case where the direction mark is displayed in association with reproduction (reproduction state) of music data includes the case where the display timings of various direction marks are associated with the sound reproduction timing of music data.

The mini-game processing section (second game processing section) 114 acquires operation information of the operation section 160 performed for the special direction mark displayed as a part (at least one) of the direction marks, and performs calculation processing of a mini-game (second game) different from the music game (first game) based on the operation information. The mini-game is a game which is performed using the operation information performed within a period in which the special direction mark overlaps (or coincides with or passes through) the reference mark. As the mini-game, a slot game in which symbols displayed while being moved are stopped and game production corresponding to the displayed symbol is performed, a batting game in which a player bats by hitting a ball with a bat, a paper-stone-scissors game, a tree-climbing game, a hole-digging game, a shooting game, and the like can be given.

The mini-game processing section 114 performs processing of performing game production based on the result of the calculation processing of the mini-game and causing the game production to be reflected as special production of the music game. As the game production reflected in the music game, addition or subtraction of points to or from the score of the music game, output of special game sound differing from normal game sound, assignment of items, change in display content of the game image, change in game parameter of the music game, and the like can be given. In the case where a plurality of players compete in the music game, game production which allows a player who has performed the operation for the special direction mark to advantageously proceed with the competition may be performed by hindering the music game of the competitor player, for example.

As the operation information used for the calculation processing of the mini-game, various types of information such as the operation timing, number of operations, operation period, and operation strength of the operation section 160 may be used. In particular, in the case of using the operation timing as the operation information of the operation section 160 used for the calculation processing of the mini-game, the timing acquisition section 112 may perform the acquisition function of the operation information for the special direction mark.

The image generation section 120 performs drawing processing based on the results of various types of processing (game processing) performed by the processing section 100 to generate an image, and outputs the image to the display section 190.

The sound generation section 130 performs sound processing based on the results of various types of processing performed by the processing section 100 to generate game sound such as background music (BGM), effect sound, or voice, and outputs the game sound to the sound output section 192. A music reproduction section 132 reproduces the music data of the music game implemented by the game system of this embodiment. In more detail, the music reproduction section 132 performs processing of reading the music data stored in a music data storage section 172 of the storage section 170, generating game sound based on the music data, and outputting the game sound to the sound output section 192.

The game system of this embodiment may be a system exclusive for a single-player mode in which only one player can play the game, or may be a system provided with a multi-player mode in which a plurality of players can play the game in addition to the single player mode. In the case where a plurality of players play the game, game images and game sound provided to the players may be generated by using one terminal, or may be generated by using a plurality of terminals (game machines or portable telephones) connected through a network (transmission line or communication line) or the like.

The music game (first game) implemented by the game system of this embodiment is described below.

In the music game of this embodiment, when a player operates the operation section 160 by beating it at a timing at which the direction mark passes through the reference mark, the music game is evaluated by comparing the operation timing with the timing criteria, and points corresponding to the evaluation are added.

Figure 3A:
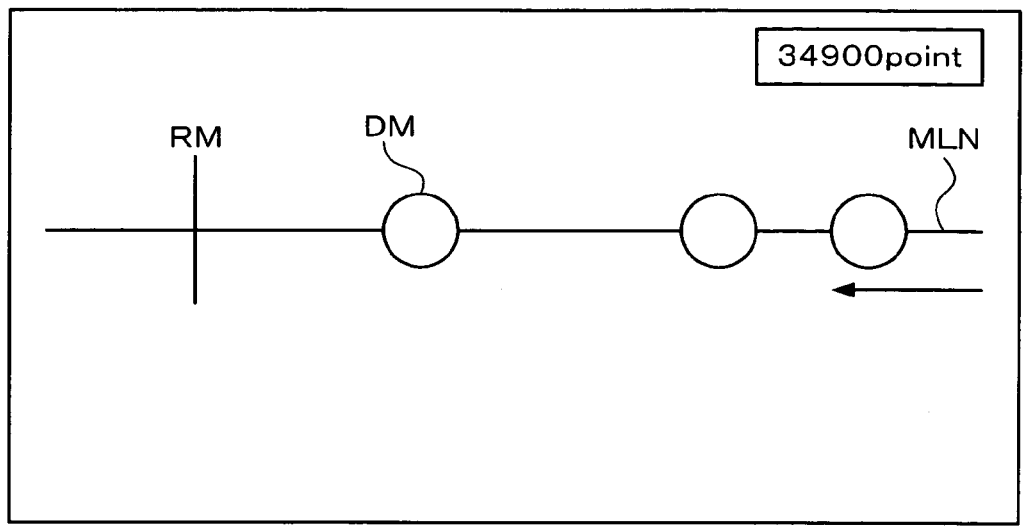
FIGS. 3A and 3B are diagrams showing an example of display control of a direction mark.
Figure 3B:
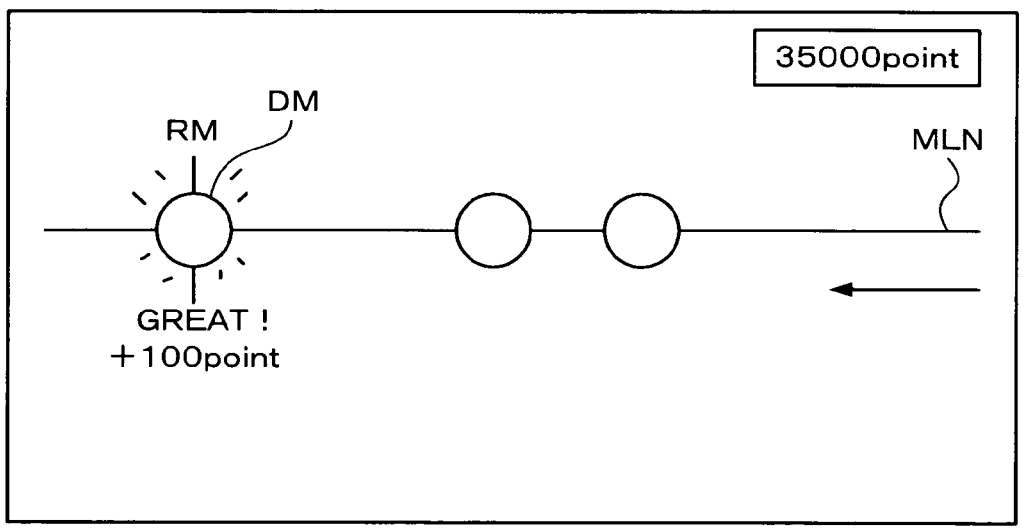

FIG. 3A shows an example of a display state of the direction mark. In FIG. 3A, display is controlled so that a direction mark DM approximately in the shape of a circle is moved on a line (music) MLN toward a linear reference mark RM. The player watches the movement state of the direction mark DM through a game image displayed in the display section 190, and operates the operation section 160 at a timing at which the direction mark DM passes through the reference mark RM, as shown in FIG. 3B. As shown in FIG. 3B, when the player operates the operation section 160 at a timing (reference timing) at which the center of the direction mark DM overlaps the reference mark RM, the player obtains high evaluation ("GREAT"), whereby high points ("100 points") are obtained in the music game.

In FIGS. 3A and 3B, the direction mark DM is displayed in a moving state, and the reference mark RM is displayed in a standstill state. However, the direction mark DM may be displayed in a standstill state, and the reference mark RM may be displayed in a moving state. Or, the direction mark DM and the reference mark RM may be moved to come closer. Specifically, it suffices that display control which causes the reference mark RM and the direction mark DM to come closer be performed by changing the relative positional relationship between the reference mark RM for judging the timing and the direction mark DM.

Figure 4A:
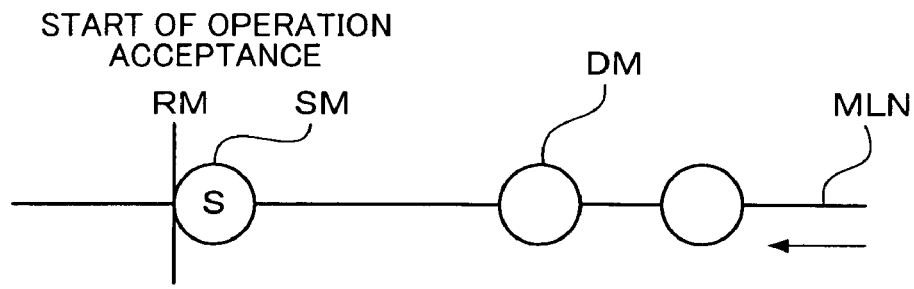
FIGS. 4A to 4C are diagrams for illustrating display control of a special direction mark and an operation acceptance period of a mini-game.
Figure 4B:
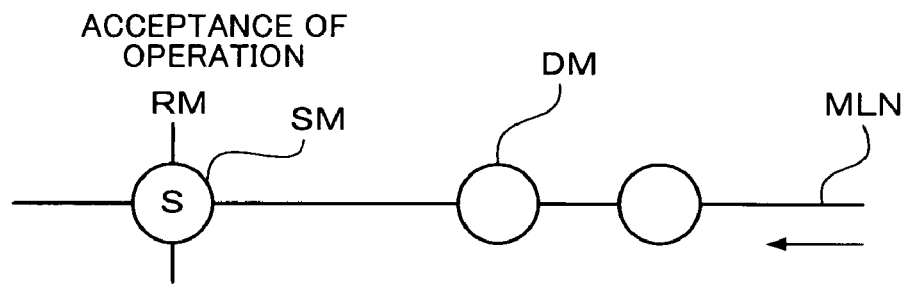
Figure 4C:
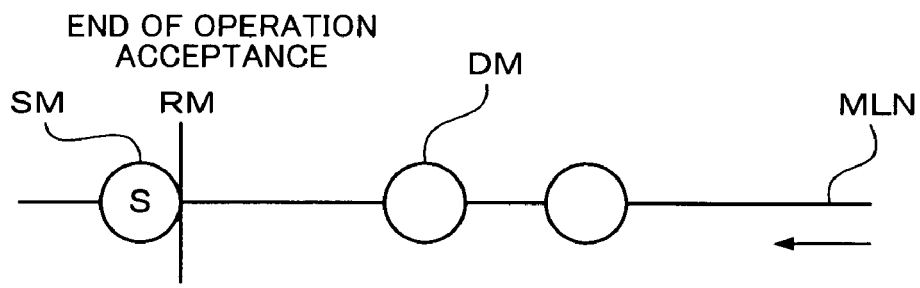

In this embodiment, a special direction mark SM for executing the mini-game (second game) is displayed as at least one of the direction marks DM, and the player is allowed to play the mini-game using a period in which the special direction mark SM overlaps the reference mark RM (period in which the special direction mark SM passes through the reference mark RM) as an operation acceptance period, as shown in FIGS. 4A to 4C. Specifically, in this embodiment, the special direction mark SM which directs the player to perform an operation of the mini-game is displayed by utilizing the direction mark DM which directs the player to perform an operation of the music game. In other words, the player must perform an operation input for the special direction mark SM for playing the mini-game in addition to an operation input for the direction mark DM for playing the normal music game. This improves playability of the music game, thereby realizing a music game which attracts interest of the player for a long period of time.

The display timing of the special direction mark SM is described below. The display timing of the special direction mark SM is set in advance in association with the music data in the same manner as the normal direction mark DM, and is stored in the mark storage section 174. For example, the display timing of the special direction mark SM may be a timing at which the music climaxes.

The special direction mark may be displayed when the game proceeding state satisfies a predetermined condition, such as when the score of the player has reached a predetermined score. This allows the player to have expectation for the appearance of the special direction mark, whereby a game which does not cause the player to lose interest can be implemented in comparison with the case of causing the special direction mark to appear periodically.

A direction mark (game start direction mark) for displaying the special direction mark (for generating the mini-game) may be displayed, and the special direction mark may be displayed on condition that an operation input for the direction mark has been performed. According to this feature, since a player cannot perform the mini-game unless the player performs an operation input for the direction mark for displaying the special direction mark, the player can decide whether or not to perform the mini-game, whereby strategic properties of the game can be increased. In particular, since the player is allowed to recognize that the mini-game accidentally occurs by performing control of displaying the direction mark for displaying the special direction mark in the same display state as the normal direction mark, expectation of the player for the appearance of the special direction mark can be further increased.

Figure 5A:
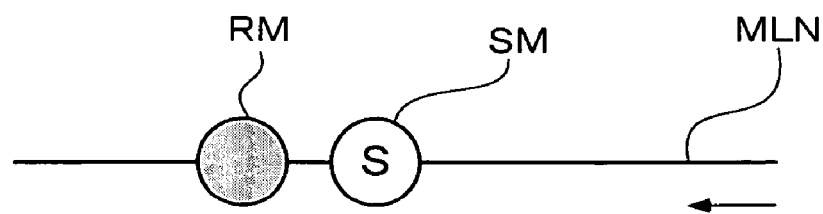
FIGS. 5A and 5B are diagrams showing an example of display of a special direction mark and a reference mark.
Figure 5B:
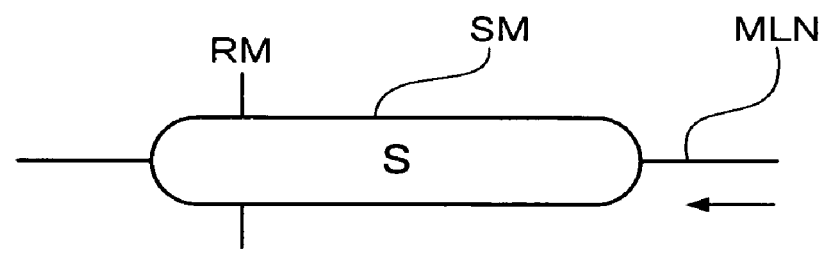

The operation acceptance period of the mini-game determined by the special direction mark SM and the reference mark RM may be changed by forming the reference mark RM to have a shape which overlaps the special direction mark SM as shown in FIG. 5A, or increasing the size (or length) of the direction mark DM as shown in FIG. 5B. In addition, various other modified forms may be employed. The operation acceptance period of the mini-game may be started on condition that a predetermined operation input (beat operation is performed once, beat operation is continuously performed two or more times, or the like) has been performed within a period in which the special direction mark SM overlaps the reference mark RM. According to this feature, a player who has quickly performed a predetermined operation input can secure a long operation acceptance period of the mini-game, and a player who has taken time for completing a predetermined operation input performs the mini-game with a short operation acceptance period, for example. Specifically, since the operation acceptance period of the mini-game can be changed while causing the operation skill of the player to be reflected, the player becomes tense for the operation of the special direction mark, whereby playability can be further increased.

Figure 6A:
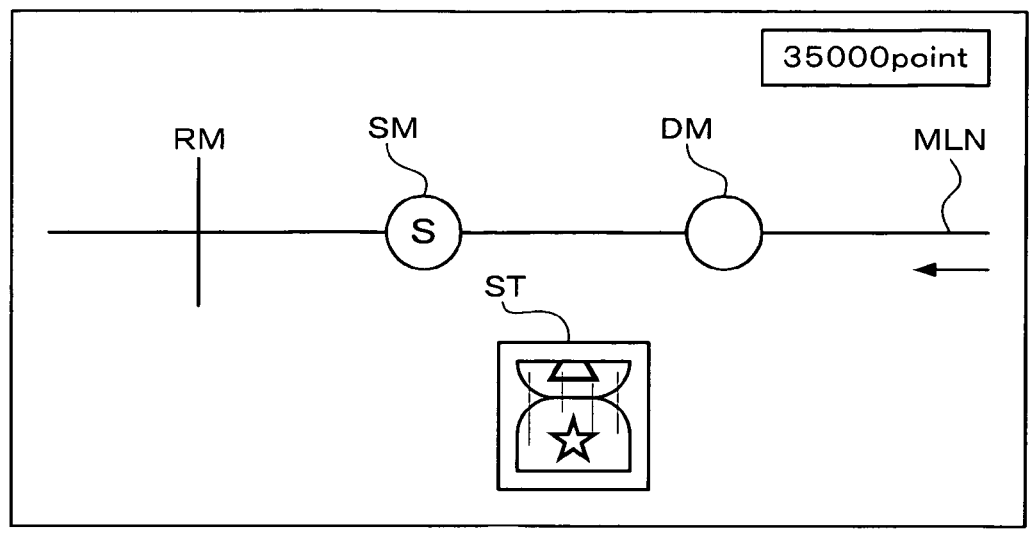
FIGS. 6A and 6B are diagrams showing an example of display control of a special direction mark and display control of a mini-game.
Figure 6B:
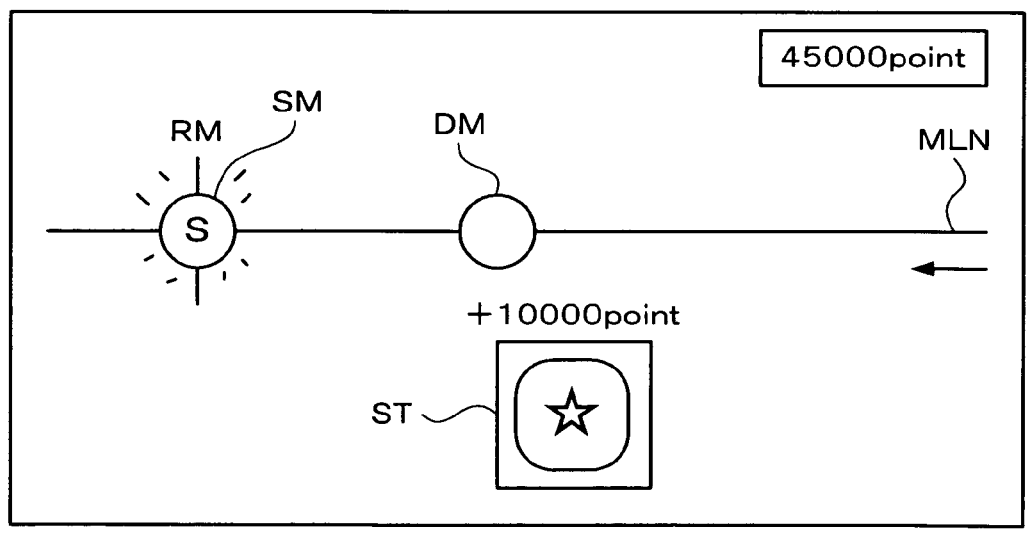

FIGS. 6A and 6B show an example of the game image of the music game displayed in the display section 190 when the mini-game is performed in the game system of this embodiment.

In FIG. 6A, the special direction mark SM is displayed on the line MLN in addition to the direction mark DM. The special direction mark SM corresponds to a slot image ST in which symbols are displayed while being moved. When an operation for the special direction mark SM is performed, a slot game, in which the symbols of the slot image ST are stopped based on the operation timing and a privilege corresponding to the displayed symbol is given, is performed as the mini-game.

As shown in FIG. 6B, when the player operates the operation section 160 for the special direction mark SM by beating the operation section 160, a symbol stopped corresponding to the operation timing is displayed in the slot image ST, and special production corresponding to the displayed symbol is performed. In FIG. 6B, bonus points of 10000 points are added corresponding to the displayed symbol "☆ (star)" as special production of the music game. In the special production, points may be subtracted from the score (−5000 points, for example) depending on the displayed symbol ("x (cross)", for example). The special production is not limited to addition or subtraction of points. The result of the mini-game may be reflected in the music game by game production corresponding to the content of the music game by outputting effect sound differing from the normal game sound, providing items, or changing the game parameter, for example. A game which rarely causes a player who has an improved operation skill of the music game to lose interest can be provided by causing the result of the mini-game to be reflected in the music game as the special production.

The music game may be evaluated when the player performs an operation for the special direction mark SM in the same manner as the operation for the normal direction mark DM. In more detail, an operation input is evaluated by acquiring the operation timing of the operation for the special direction mark SM, and comparing the operation timing with the timing criteria. This allows the player to judge whether to perform an operation input for the special direction mark SM while attaching importance to either the result of the music game or the result of the mini-game, whereby strategic properties of the game can be increased. Therefore, an advanced music game in which the intention of the player is reflected when allowing the player to play the mini-game can be implemented.

The relationship between the criteria of the operation timing for the direction mark DM (first timing criteria in a broad sense) and the criteria of the operation timing for the special direction mark SM (second timing criteria in a broad sense) is described below. FIGS. 7A to 7D show examples of the criteria of the operation timing of the music game and the criteria of the operation timing of the mini-game.

As shown in FIGS. 7A to 7D, the operation timing of the music game (operation timing for direction mark DM) is judged by comparison by judging whether the operation timing performed within a period in which the direction mark DM passes through the reference mark RM (period excluding MISS) corresponds to a certain timing interval of the criteria (degree of coincidence with or degree of difference from the timing interval "GREAT" used as the reference). Specifically, the operation timing is judged to be "GREAT" when the operation timing is positioned within the timing interval "GREAT" as the reference timing, and the operation timing is judged to be "GOOD" or "BAD" as the difference from the timing interval "GREAT" as the reference timing is increased. The operation performed after a predetermined period has elapsed (after the direction mark DM has passed the reference mark RM, for example) is judged to be a "MISS".

Figure 7A:
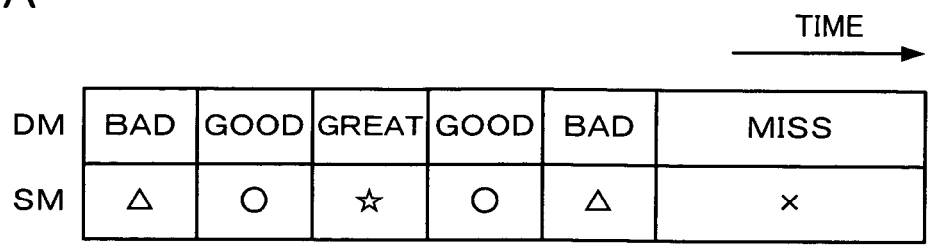
FIGS. 7A to 7D are tables showing an example of criteria of operation timing.

The judgment of the operation timing of the mini-game (judgment of the operation timing for the special direction mark SM) may be performed by dividing the mini-game judgment timing intervals in the same manner as the music game judgment timing intervals so that the judgment timing intervals are in common between the music game and the mini-game as a first aspect as shown in FIG. 7A. This enables the player to perform an operation input for the special direction mark SM at the same timing as an operation input for the direction mark DM performed in the music game. This prevents the operation input from being complicated, whereby an inexperienced player can play the music game with high playability.

In this example, symbols stopped by the operation for the special direction mark SM are set so that higher bonus points are obtained in the order of "☆ (star)", "○ (circle)", "△ (triangle)", "X (cross)".

In this case, in the first aspect shown in FIG. 7A, the criteria of the operation timing for the direction mark DM and the criteria of the operation timing for the special direction mark SM are arranged in the same evaluation order. The criteria are set so that the evaluation becomes lower as the distance is increased from the highest evaluation timing intervals "GREAT" and "☆ (star)". Specifically, when the player performs an operation for the special direction mark SM, the player can aim at a symbol by which high bonus points are obtained in the mini-game by performing the operation at the same timing as that of the operation for the normal direction mark DM.

Figure 7B:
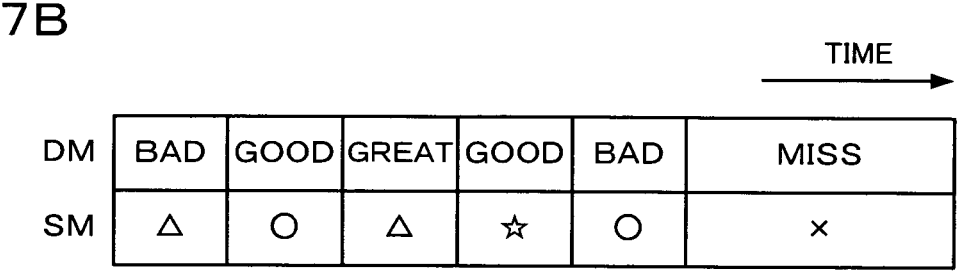

As a second aspect, the evaluation arrangement of the criteria of the special direction mark SM may be allowed to differ from the evaluation arrangement of the criteria of the direction mark, as shown in FIG. 7B. In FIG. 7B, the timing interval "☆ (star)" in which the evaluation of the operation timing for the special direction mark SM is the highest is the same timing interval as the timing interval "GOOD" for the direction mark DM, for example. If the timing interval in which the highest evaluation is obtained differs between the normal direction mark DM and the special direction mark SM, the player cannot obtain high evaluation in the mini-game merely by performing the operation input at the timing for "GREAT" without distinguishing the direction mark DM from the special direction mark SM. Therefore, since the operation is simplified to only a small extent in the aspect shown in FIG. 7B, a music game with high playability which can attract the interest of the player for a long period of time can be implemented.

Figure 7C:
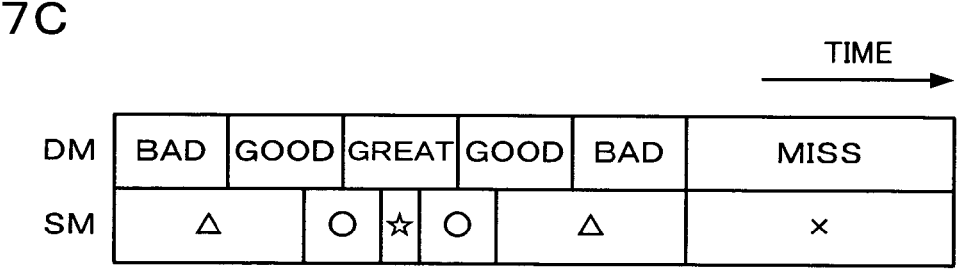
Figure 7D:

Playability can also be increased by causing the timing intervals of the criteria of the operation timing for the direction mark DM to differ from the timing intervals of the criteria of the operation timing for the special direction mark SM as a third aspect as shown in FIG. 7C, or by subdividing the timing intervals of the criteria of the operation timing for the special direction mark SM in comparison with the timing intervals of the criteria of the operation timing for the direction mark DM as a fourth aspect as shown in FIG. 7D.

The calculation processing results (evaluation) which differ between the music game and the mini-game can be obtained for the operation timing of the operation performed for the special direction mark SM by individually providing the criteria for the music game (first game) for evaluating the operation timing and the mini-game (second game). Therefore, strategic properties of the game can be increased by allowing the player to judge whether to perform the operation input for the special direction mark SM while attaching importance to either the result of the music game or the result of the mini-game. Therefore, an advanced music game in which the intention of the player is reflected when allowing the player to perform the mini-game can be implemented.

Figure 8A:
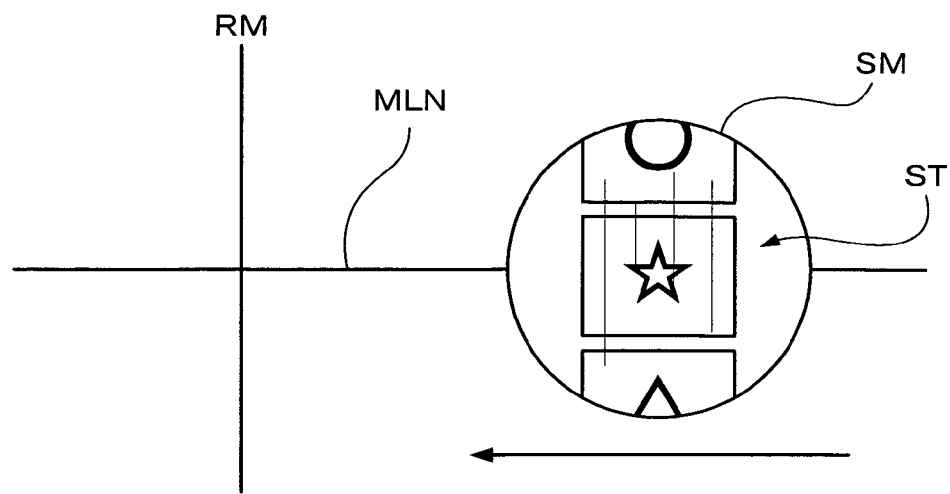
FIGS. 8A and 8B are diagrams showing an example of display control of a special direction mark.

The above description illustrates the case where the slot image ST which is the game image for the mini-game and the special direction mark SM are individually displayed. However, this embodiment is not limited thereto. For example, the content of the mini-game may be displayed on the special direction mark SM. In more detail, the slot image ST may be displayed on the special direction mark SM, as shown in FIG. 8A. In this case, since the player can perform the mini-game from the same viewpoint as the viewpoint when playing the music game by carefully watching the line MLN on which the special direction mark SM is displayed in a moving state, the operation of the mini-game can be facilitated by reducing movement of the viewpoint of the player. This prevents an inexperienced player from performing a complicated operation. Moreover, an inexperienced player can sufficiently enjoy the mini-game while playing the music game.

Figure 8B:
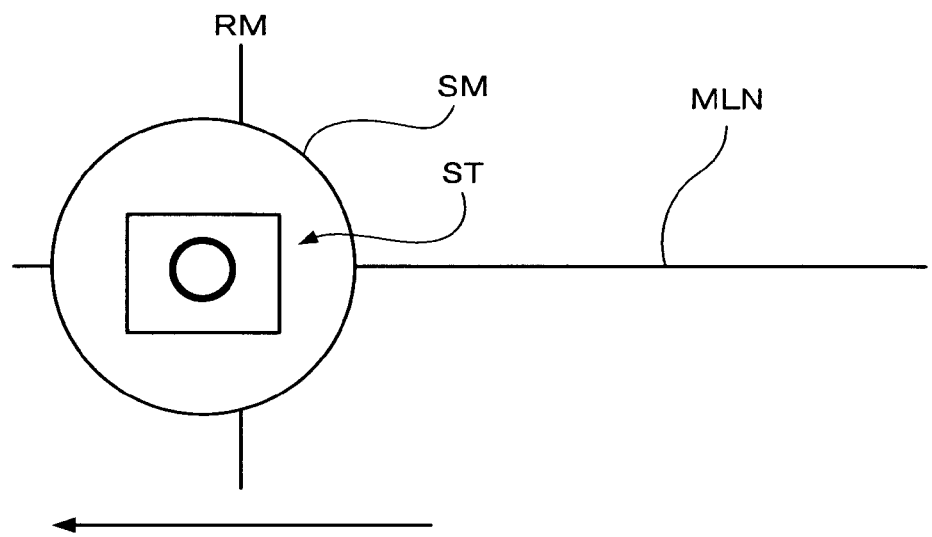

When the slot image ST is displayed on the special direction mark SM as shown in FIG. 8A, specifically, when the content of the mini-game is displayed on the special direction mark SM, it is preferable to display the result of the mini-game on the special direction mark SM on condition that the player has performed an operation input for the special direction mark SM. In more detail, as shown in FIG. 8B, when the player operates the operation section 160 in a period in which the special direction mark SM overlaps the reference mark RM, a displayed symbol "○ (circle)" corresponding to the operation timing is displayed on the special direction mark SM. The displayed symbol may be individually displayed in a display region differing from the special direction mark SM.

Figure 9A:
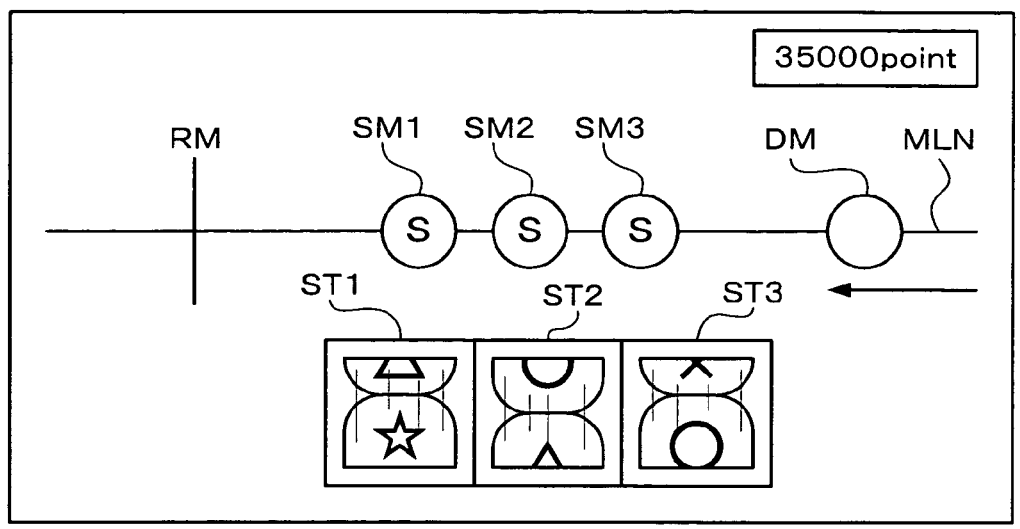
FIGS. 9A and 9B are diagrams showing an example of display control of a special direction mark and display control of a mini-game.

When the player is allowed to perform a slot game as the mini-game, special production such as addition of bonus points may be performed depending on the combination of displayed symbols of slot images ST1 to ST3 using a plurality of special direction marks SM1 to SM3, as shown in FIG. 9A.

Figure 9B:
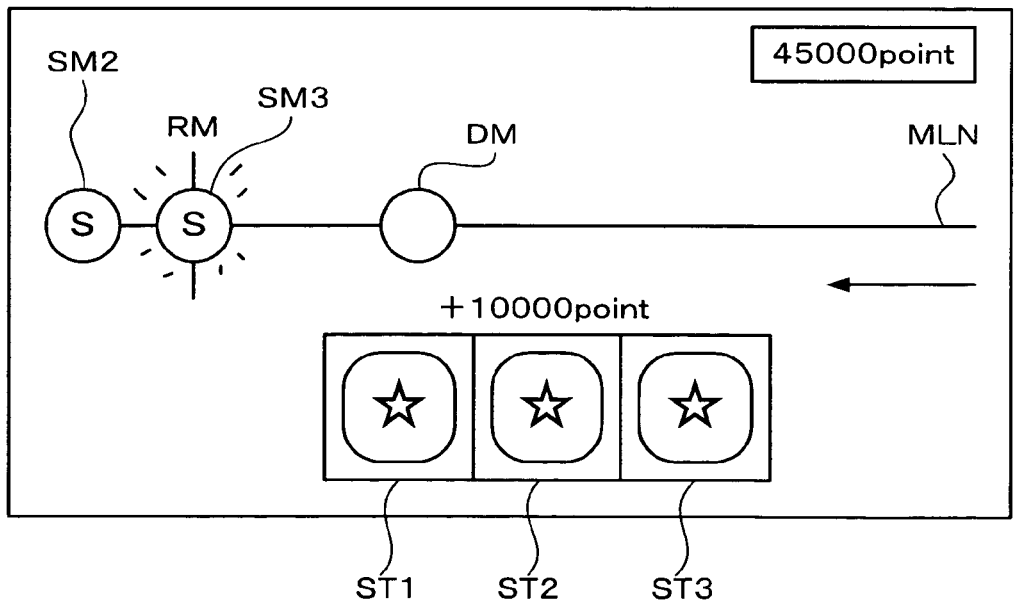

In this case, the special direction marks SM1 to SM3 are respectively associated with the slot images ST1 to ST3, and calculation processing of the mini-game which stops the symbols of the slot images ST1 to ST3 based on the operation timing for each of the special direction marks SM1 to SM3 is performed, as shown in FIG. 9B. Specifically, processing of causing the result of the calculation processing of the mini-game (combination of displayed symbols of the slot images ST1 to ST3, for example) to be reflected in the music game (special production such as addition of bonus points) may be performed when the operation of the operation section 160 is performed for all the special direction marks SM1 to SM3. According to this feature, since the result of the mini-game based on the displayed symbols of the slot images ST1 to ST3 of the mini-game is not decided until the player finishes the operation input for all the special direction marks SM1 to SM3, expectation of the player is sequentially changed when performing the operation input for the special direction marks SM1 to SM3, whereby the mini-game can be provided with higher strategic properties.

The above description illustrates the case where the calculation processing of the mini-game (stopping of the symbols displayed in the slot image in a moving state) is performed based on the operation timing performed by the player for the special direction mark. However, the operation information of the operation section 160 utilized for the calculation processing of the mini-game is not limited to the operation timing. For example, various mini-games may be performed based on the number of operations, operation period, or operation strength of the operation section 160.

Figure 10A:
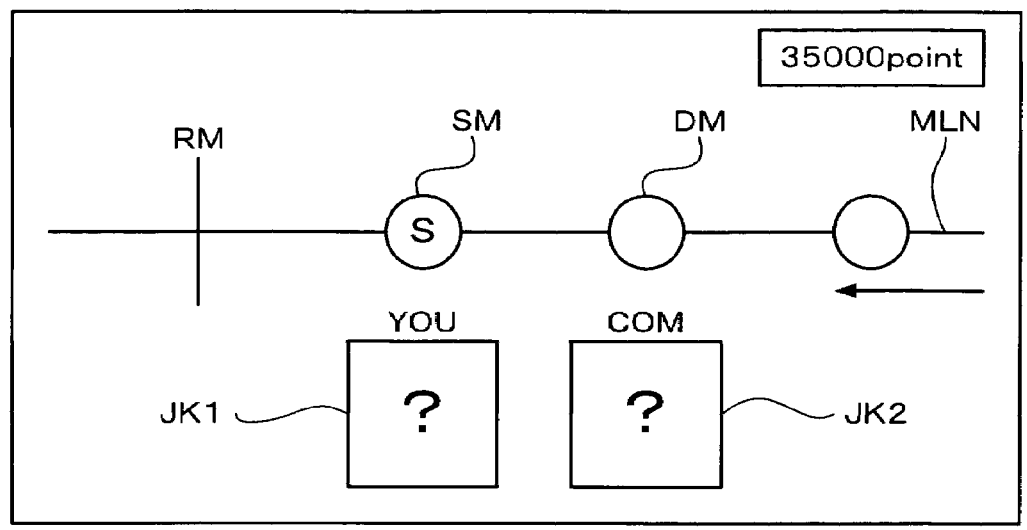
FIGS. 10A and 10B are diagrams showing an example of display control of a special direction mark and display control of a mini-game.

For example, when the number of operations of the operation section 160 is used as the operation information for the calculation processing of the mini-game, a paper-stone-scissors game (Janken game) in which a player competes with a computer using symbols such as "stone", "scissors", and "paper" determined corresponding to the number of operations may be employed. This enables the player to select an arbitrary symbol corresponding to the number of operations of the operation section 160, whereby strategic properties of the mini-game can be increased. In more detail, as shown in FIG. 10A, a Janken symbol display region JK1 for a player and a Janken symbol display region JK2 for a computer as a competitor are provided in the game image corresponding to display of the special direction mark SM. When the player operates the operation section 160 an arbitrary number of times within a period in which the special direction mark SM overlaps the reference mark RM, the number of operations counted is compared with the criteria, and one of the symbols "stone", "scissors", and "paper" is selected as the comparison result and displayed in the player's Janken symbol display region JK1. In this case, the criteria for the mini-game are set so that "stone" is selected when the operation section 160 is operated once and "scissors" and "paper" are respectively selected when the operation section 160 is operated twice and three times, and are stored in the criterion data storage section 176, for example. The Janken symbol for the computer may be determined by a lottery. A configuration in which the Janken symbol for the player is determined by a lottery may be employed.

Figure 10B:
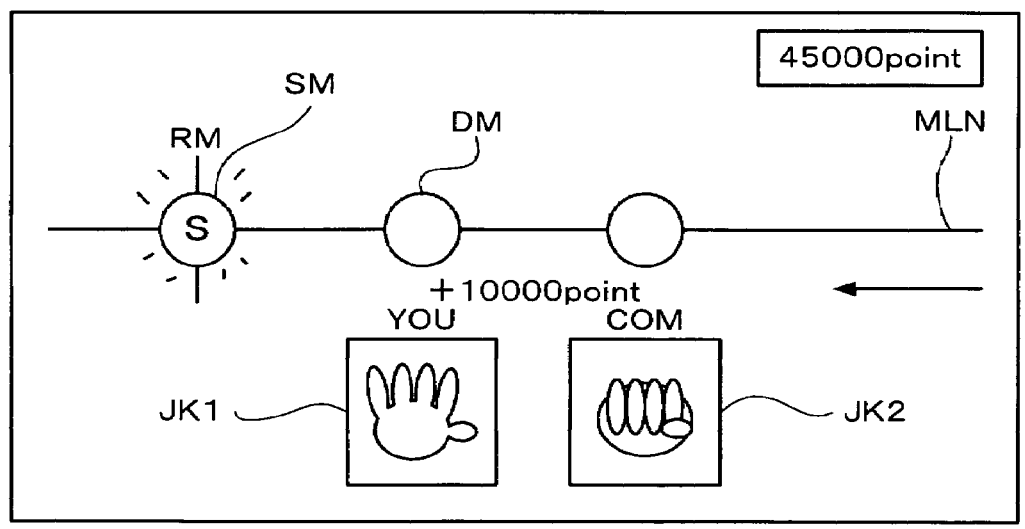

In FIG. 10B, the player has performed the operation three times within the operation acceptance period of the special direction mark SM, and an image which represents "paper" is displayed in the player's Janken symbol display region JK1. An image which represents "stone" is displayed in the computer's Janken symbol display region JK2 as a lottery result. When the Janken symbol of the player and the Janken symbol of the computer have been decided, superiority or inferiority of the Janken symbol of the player and the Janken symbol of the computer is judged based on Janken game setting information which specifies "stone wins against scissors", "scissors wins against paper", and "paper wins against stone". As a result, the player is judged to win in the example FIG. 10B, and 10000 points are added to the score as bonus points. The Janken game setting information is stored in the criterion data storage section 176 as the mini-game criterion data.

The above description illustrates the case where the music game is a single play game. In the case where a plurality of players can play a competition game, the mini-game may be performed as described below.

For example, the competition state between players who are performing competition play of the music game may be monitored by the game calculation section 110, and, when it is judged that one of the players is in a disadvantageous competition state in comparison with the other player, control of displaying the special direction mark for the player who is in a disadvantageous competition state may be performed.

In more detail, the music game may be configured so that the players compete for the score obtained by the comparison result of the operation timing in the music game, and the competition play can be made more exciting by giving the opportunity of retrieval to the disadvantaged player by monitoring the difference in score between the competition players as the competition state and preferentially displaying the special direction mark for the player who scores lower than the other player.

Figure 11:
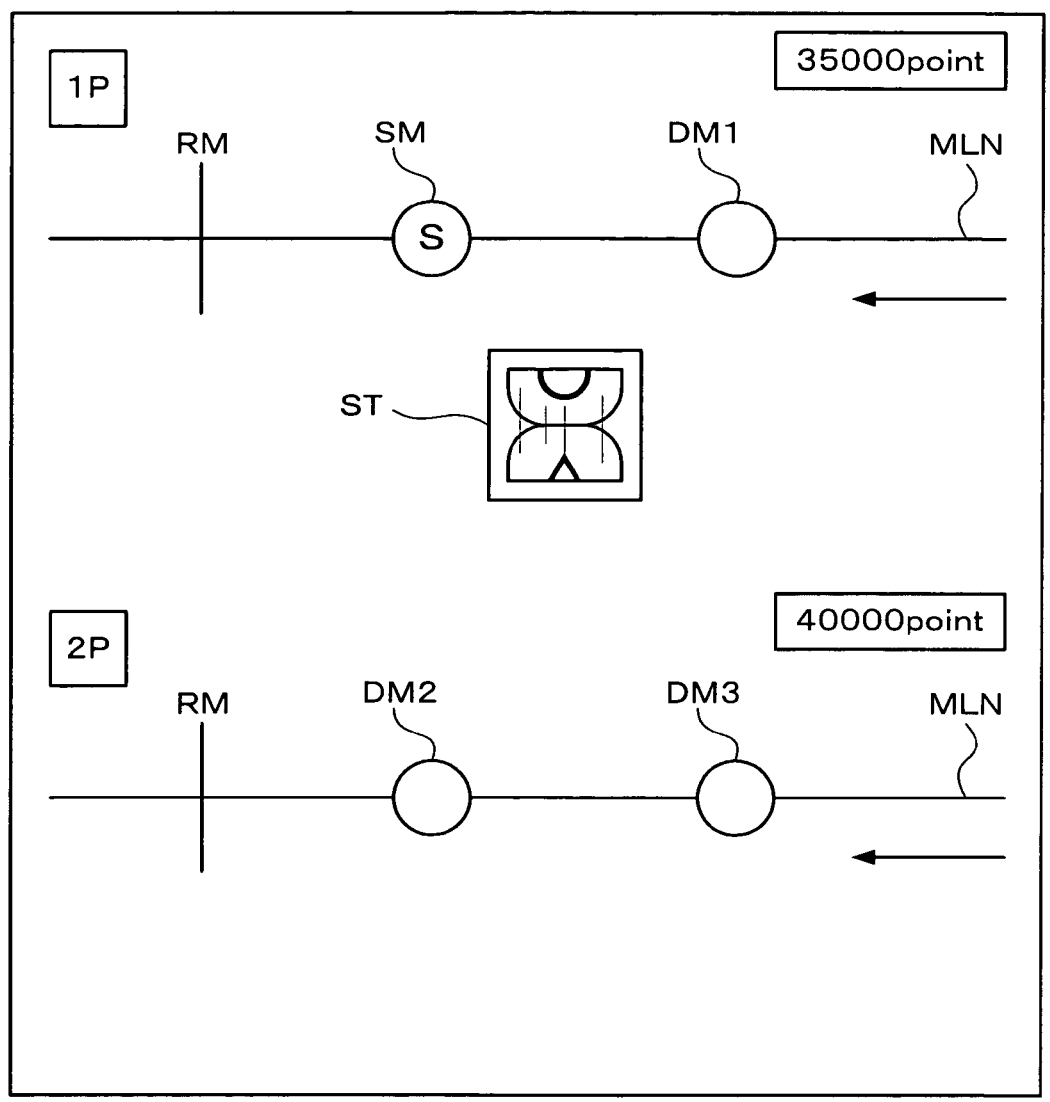
FIG. 11 is a diagram showing an example of display control of a special direction mark and display control of a mini-game in a competition game.

In FIG. 11, in a competition play between a player 1P and a player 2P, the special direction mark SM and the slot image ST are displayed for the player 1P who scores lower in addition to a normal direction mark DM1, and the player 1P can play the mini-game in which the player 1P wins a privilege by stopping symbols displayed in a moving state. In this case, direction marks DM2 and DM3 for the normal music game are displayed for the player 2P.

Figure 12:
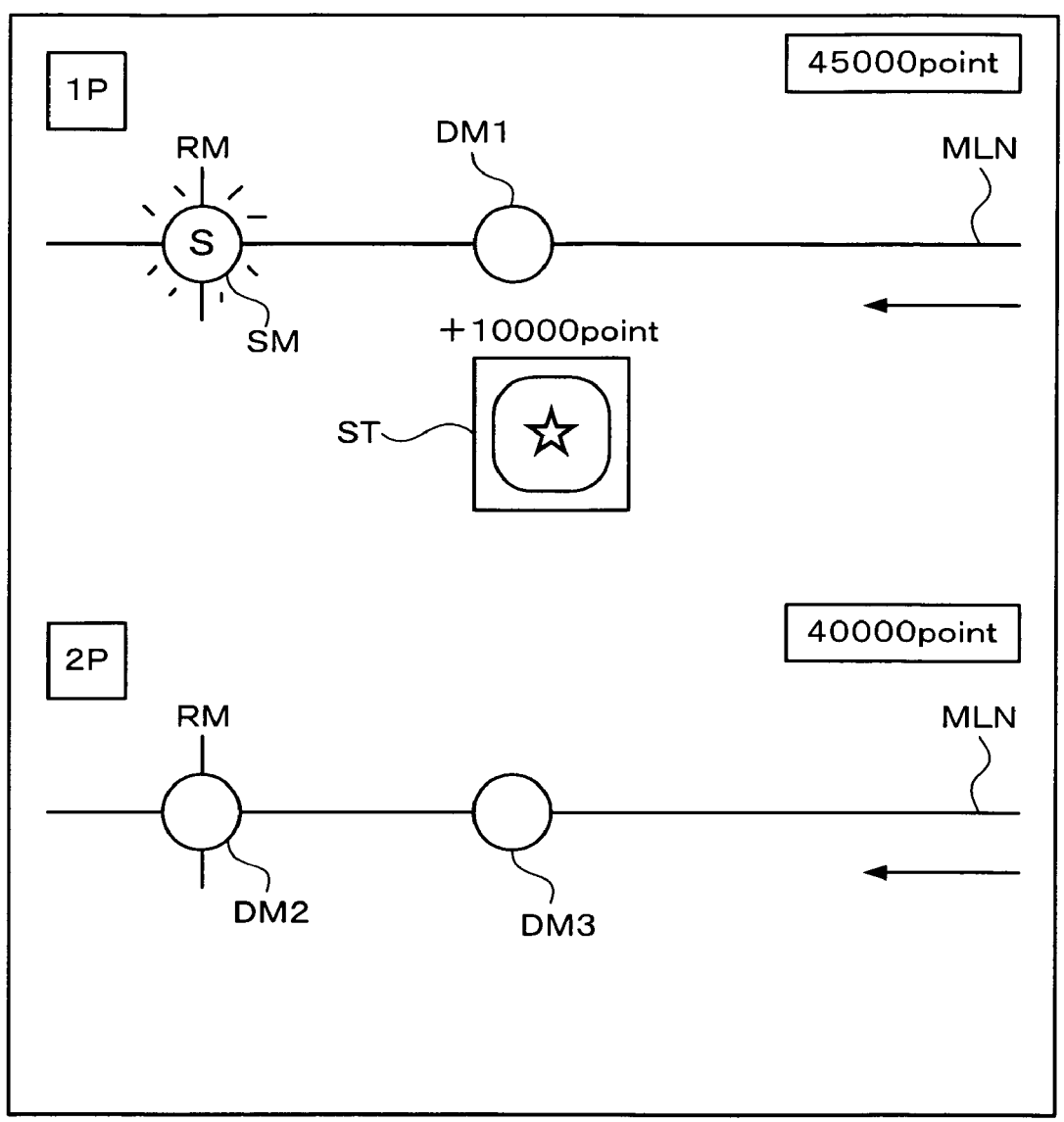
FIG. 12 is a diagram showing an example of display control of a special direction mark and display control of a mini-game in a competition game.

As shown in FIG. 12, when the player 1P performs an operation for the special direction mark SM in a period in which the special direction mark SM overlaps the reference mark RM, the symbol of the slot image ST stops, and special production in which bonus points of 10000 points are added to the score of the player 1P as a privilege corresponding to the displayed symbol "☆ (star)" is performed. As the special production, a privilege in which the music game of the player who has performed the mini-game is automatically played or judgment of the operation timing for the direction mark is made less severe for a predetermined period may be awarded to the player in addition to the addition of bonus points.

When one of the players who perform the competition play performs an operation for the special direction mark, the calculation processing of the mini-game may be performed based on the operation information performed by the player, and the result of the mini-game may be reflected in the music game performed by the competitor player.

Figure 13:
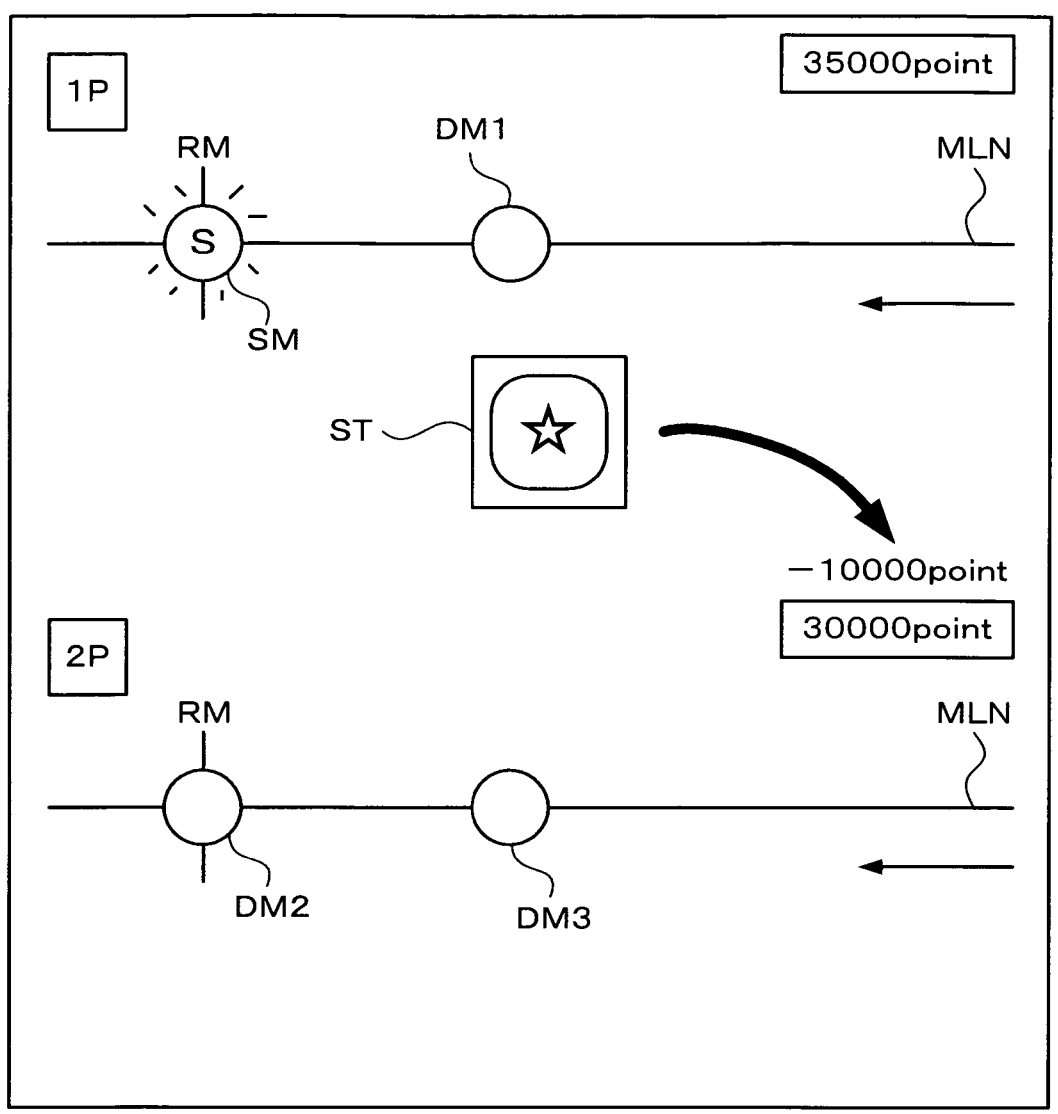
FIG. 13 is a diagram showing an example of display control of a special direction mark and display control of a mini-game in a competition game.

In more detail, as shown in FIG. 13, the special direction mark SM is displayed for the player 1P, and the player 1P performs an operation for the special direction mark SM. In this case, when the symbols of the slot image ST stop at "☆ (star)" based on the operation timing for the special direction mark SM, special production in which 10000 points are subtracted from the score of the competitor player 2P is performed, whereby the result of the mini-game performed by the player 1P is reflected in the music game performed by the player 2P. This enables the player 1P to strategically proceed with the music game by performing the mini-game while watching the state of the competitor player 2P, whereby the players can enjoy an exciting competition game. In particular, a competition game can be made more exciting by performing game production which hinders the competitor player as the special production reflected in the music game corresponding to the result of the mini-game, for example, by subtracting points from the score, making the direction mark difficult to be seen so as to hinder the competitor's operation input, or increasing the degree of difficulty of the music game performed by the competitor player.

In the case where the music game is a competition play game, the mini-game may also be a competition play game. In this case, the above-described Janken game is suitable.

Figure 14:
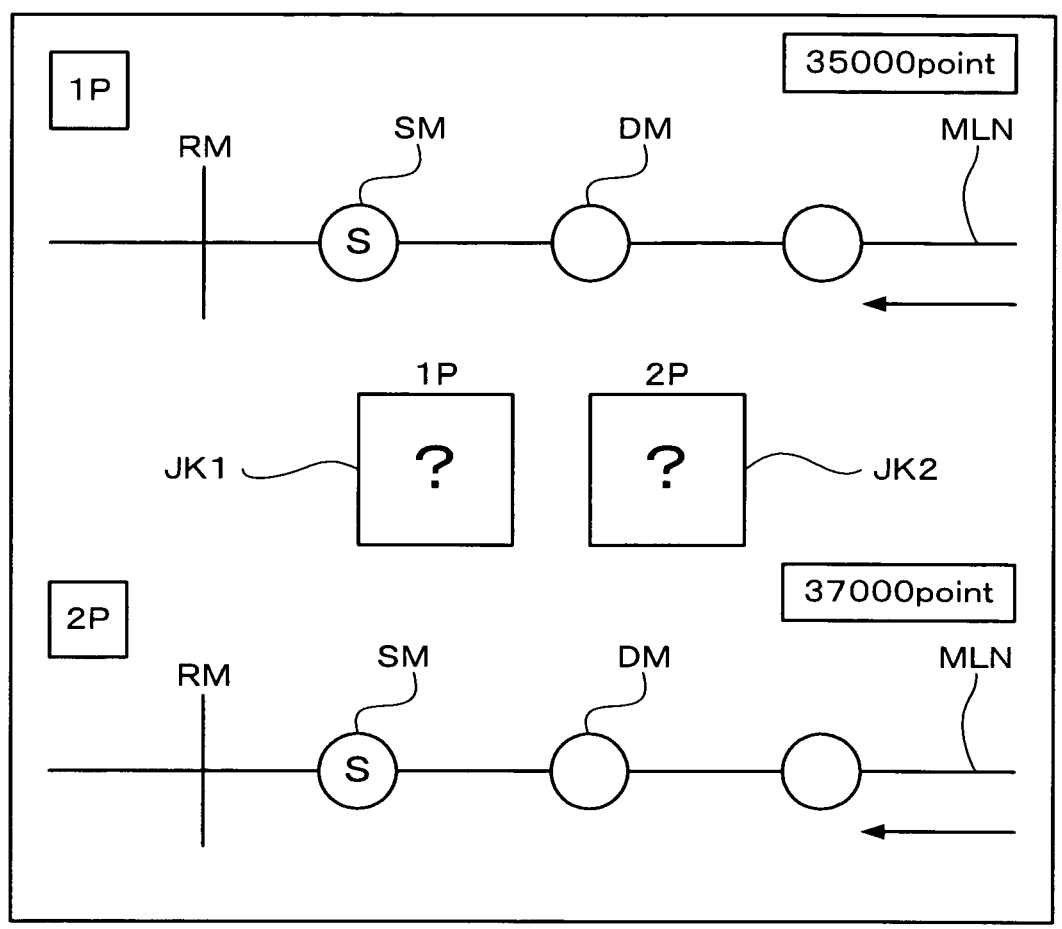
FIG. 14 is a diagram showing an example of display control of a special direction mark and display control of a mini-game in a competition game.

For example, as shown in FIG. 14, in a competition play between the player 1P and the player 2P, the special direction marks SM are displayed for the player 1P and the player 2P, and the Janken symbol display region JK1 for the player 1P and the Janken symbol display region JK2 for the player 2P are displayed.

Figure 15:
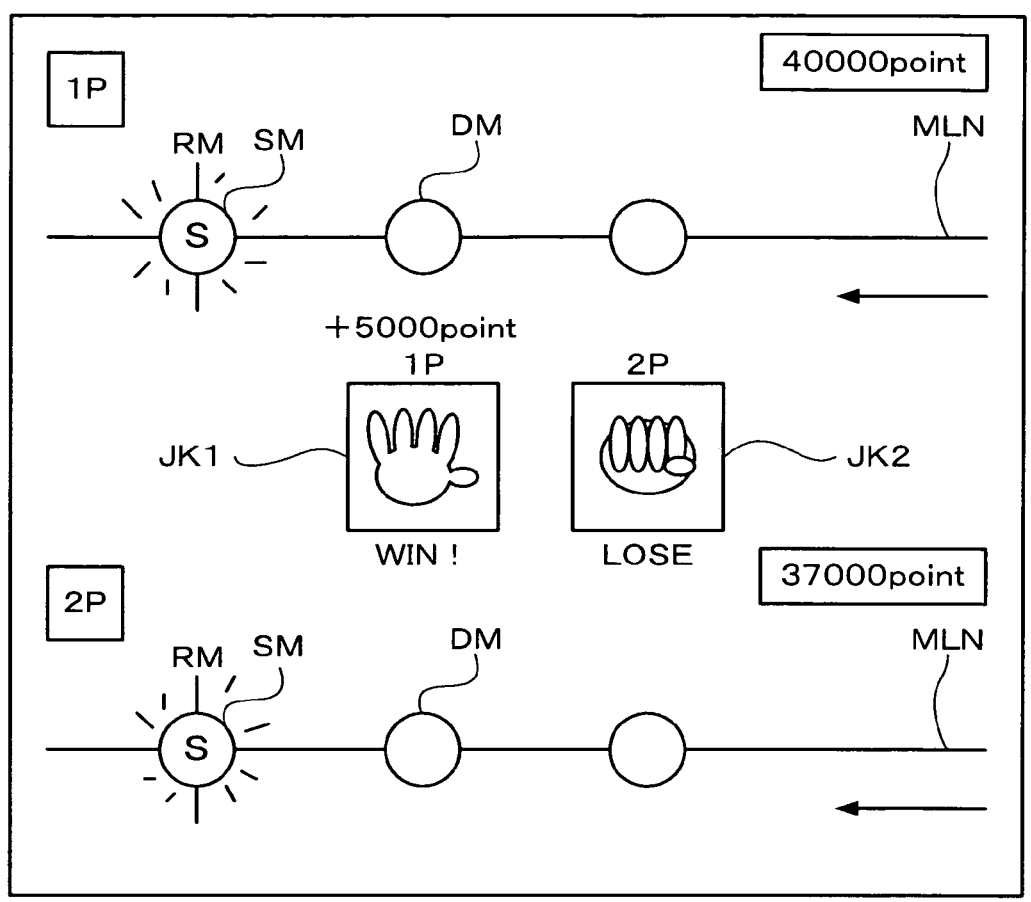
FIG. 15 is a diagram showing an example of display control of a special direction mark and display control of a mini-game in a competition game.

As shown in FIG. 15, when the players perform an operation for the special direction mark SM while expecting the move of the competitor player, Janken symbols corresponding to the number of operations are displayed. In this case, the player 1P has selected a symbol "paper", and the player 2P has selected a symbol "stone". Then, victory or defeat is determined based on the Janken game setting information to judge that the player 1P wins, and special production in which 5000 points are awarded to the player 1P who wins as bonus points is performed. Therefore, the player 1P who scores lower in the music game reverses the competition state by the victory in the mini-game. An exciting game development can be provided by making not only the music game but also the mini-game competitive.

In the case where the music game is a competition play game, only one of the players may be allowed to play the mini-game, and, when it is determined that the operation information on the operation section for the special direction mark does not satisfy a predetermined condition in the mini-game, control of displaying the special direction mark for the competitor player may be performed. This allows each player to eagerly play the mini-game by alternately giving the opportunity of performing the mini-game to the players, whereby an exciting competition game can be implemented.

Figure 16:
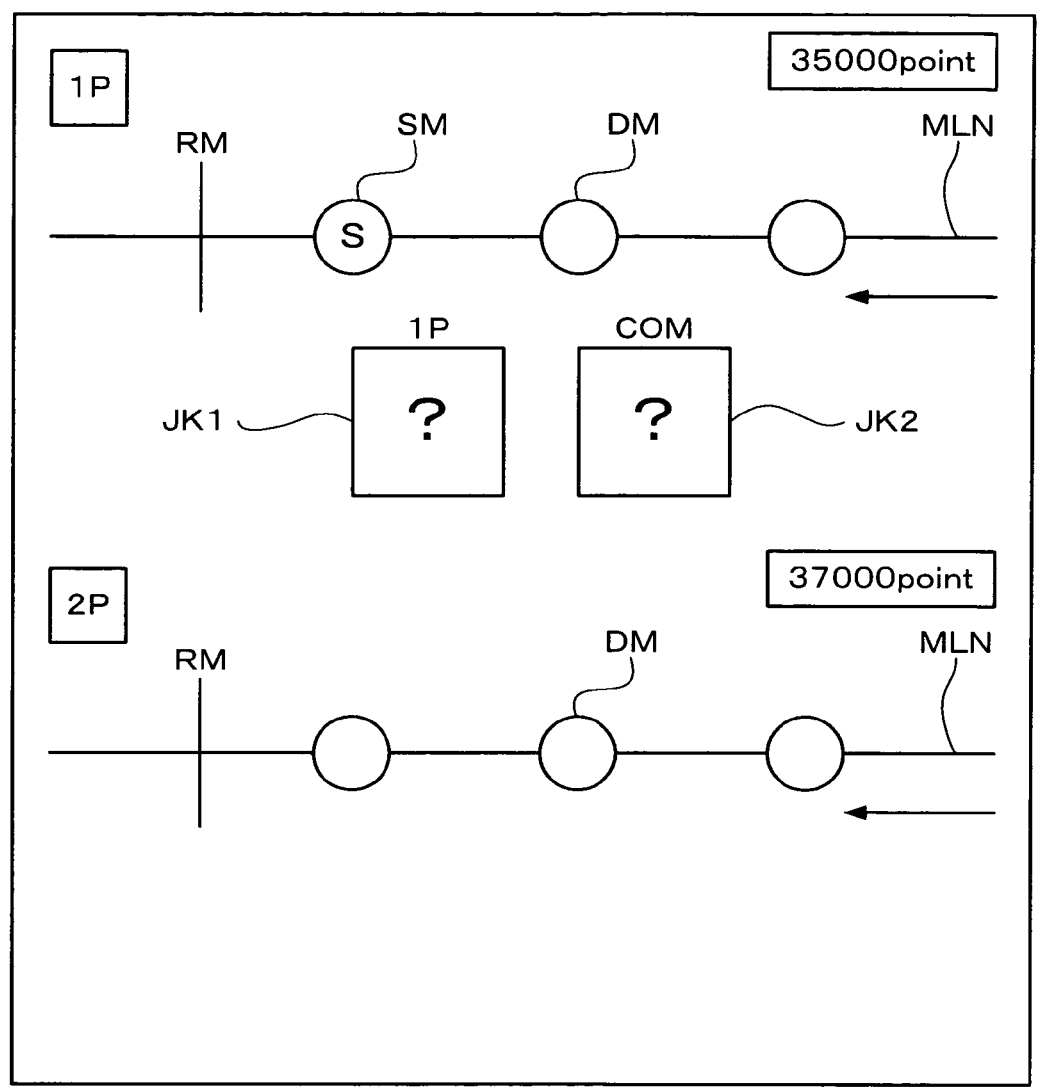
FIG. 16 is a diagram showing an example of display control of a special direction mark and display control of a mini-game in a competition game.
Figure 17:
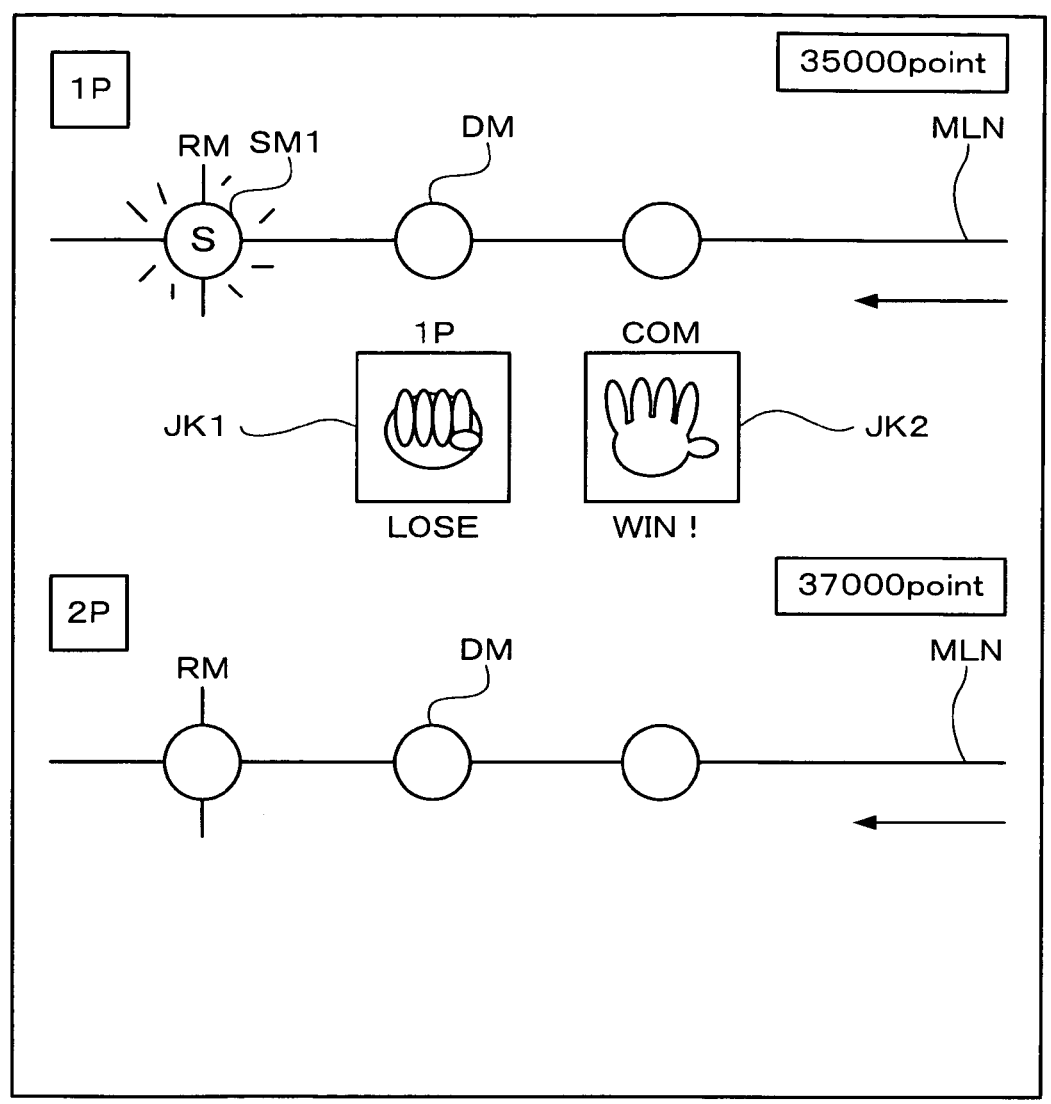
FIG. 17 is a diagram showing an example of display control of a special direction mark and display control of a mini-game in a competition game.

In more detail, control of displaying the special direction mark SM1 for the player 1P is performed, as shown in FIG. 16. In FIG. 16, the mini-game is the Janken game, and the Janken symbol display region JK1 for the player 1P and the Janken symbol display region JK2 for the computer are provided in the game image. As shown in FIG. 17, when the player 1P performs an operation within a period in which the special direction mark SM1 passes through the reference mark RM, the number of operations performed within the operation acceptance period is counted. For example, when the number of operations is 1, "stone" is displayed in the Janken symbol display region JK1 for the player 1P as the Janken symbol of the player 1P. A lottery of the Janken symbol of the computer is performed, and "paper" is displayed in the Janken symbol display region JK2 for the computer as the lottery result, for example. The computer is judged to win by comparison between the Janken symbol of the player 1P and the Janken symbol of the computer based on the Janken game setting information, and the result is displayed.

Figure 18:
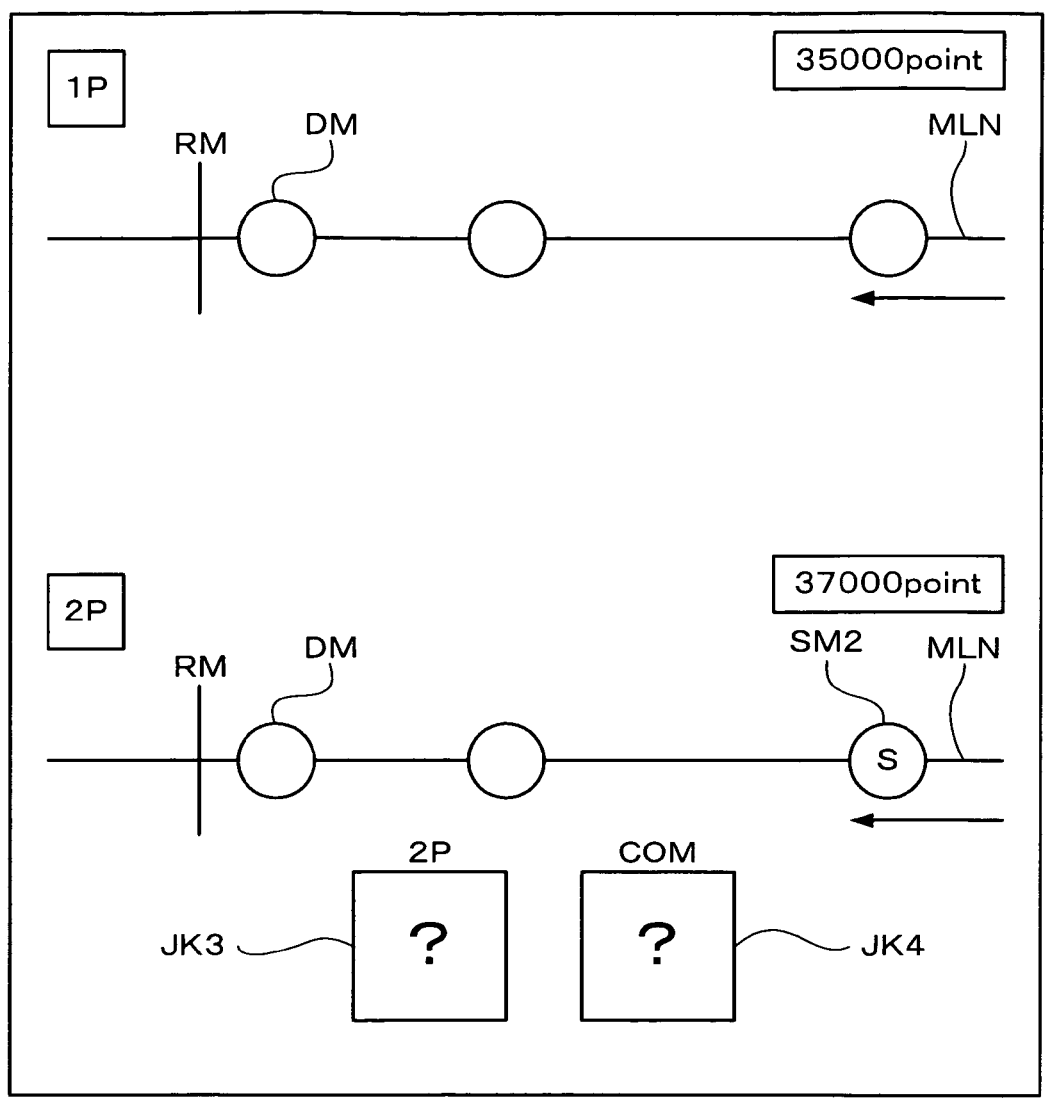
FIG. 18 is a diagram showing an example of display control of a special direction mark and display control of a mini-game in a competition game.

In this case, the mini-game processing section 114 judges whether or not the mini-game performed by the player 1P satisfies a predetermined condition. In more detail, when a condition "winning against the computer" is set as the predetermined condition of the Janken game, since the player 1P loses to the computer, the predetermined condition of the mini-game is not satisfied. Therefore, as shown in FIG. 18, the special direction mark SM2 is displayed for the player 2P, and a Janken symbol display region JK3 for the player 2P and a Janken symbol display region JK4 for the computer are provided. This allows the right to perform the Janken game to be transferred to the player 2P from the player 1P. Since the condition is satisfied when the player 2P wins against the computer in the Janken game, special production in which a privilege such as addition of bonus points is awarded to the player 2P is performed. The player 1P may be allowed to play the Janken game when the player 2P loses to or draws with the computer in the Janken game.

Figure 19:
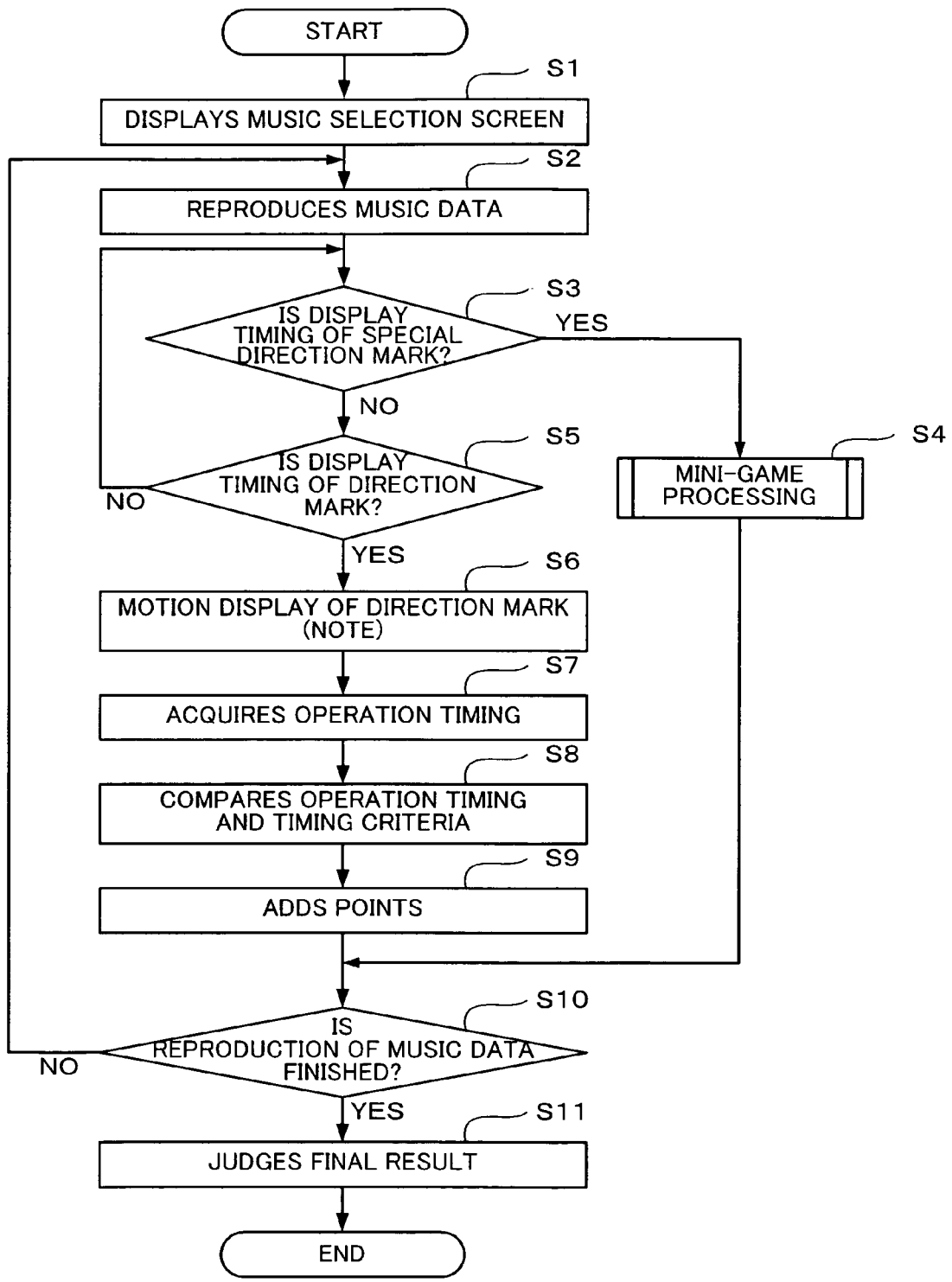
FIG. 19 is a flowchart showing a processing example according to one embodiment of the present invention.

A detailed processing example of this embodiment is described below using a flowchart shown in FIG. 19.

First, processing of displaying a screen for allowing the player to select music of a music game is performed (step S1). Processing of outputting the music selected by the player is performed (step S2). Specifically, the music reproduction section 132 reads the music data of the selected music from the music data storage section 172, reproduces the music data, and outputs the music from the sound output section 192.

The display timing of various direction marks (notes) set to be displayed in association with the reproduction state of the music data is judged. In more detail, whether the current timing is the display timing of the special direction mark (step S3) or the display timing of the normal direction mark (step S5) is judged.

In this case, when the display timing of the special direction mark has come during reproduction of the music data (YES in step S3), mini-game processing is performed (step S4). When the display timing of the normal direction mark has come (YES in step S5), movement display processing of the direction mark (note) is performed as described with reference to FIGS. 3A and 3B and the like (step S6). Specifically, the direction mark is moved on the line at a given moving speed. The reference mark may be moved toward the direction mark in the movement processing in the step S3. It is judged that the display timing of the special direction mark has come when the display timing is associated with the music data in advance, when a predetermined condition (scoring state, reproduction state, or superiority or inferiority relationship between players in the case of competition) for displaying the special direction mark for each play corresponding to the progress state of the game is satisfied, or the like.

Processing of acquiring the operation timing is performed (step S7). Specifically, when a player operates the operation section 160 according to the direction of the direction mark displayed by the movement display processing in the step S6, the data of the operation timing of the operation performed by the player (operation data for music game in a broad sense) is sampled in frame units, and retained in the operation data storage buffer, for example.

Comparison processing between the acquired operation timing and the timing criteria is performed (step S8). Specifically, the comparison processing between the data of the operation timing stored in the storage buffer and the data of the timing criteria stored in the criterion data storage section 176 is performed. For example, the comparison processing is performed so that the evaluation of the operation of the player becomes higher as the difference between the operation timing and the timing "GREAT" as the reference becomes smaller, as shown in FIGS. 7A to 7D.

Addition processing of the score of the player is performed (step S9). In more detail, points corresponding to the evaluation of the operation of the player by the comparison in the step S8 are added to the score of the player.

Whether or not the music has been completed is judged (step S10). When the music has not been completed, the operation returns to the step S2. When the music has been completed, the final game result of the player is judged and displayed (step S11).

A mini-game processing example performed when the display timing of the special direction mark is judged to have come in the step S3 is described below using a flowchart shown in FIG. 20.

When the display timing of the special direction mark has come (YES in the step S3 in FIG. 19), a mini-game image is displayed as described with reference to FIGS. 6A and 6B and the like (step S101). When the mini-game is a slot game, the special direction mark and a slot image in which symbols are displayed in a moving state are displayed.

Movement display processing of the special direction mark is performed corresponding to the display of the mini-game image (step S102). Specifically, the special direction mark is moved on the line at a given moving speed. The reference mark may be moved toward the direction mark in the movement processing in the step S101.

The display processing of the mini-game image and the movement display processing of the special direction mark may be performed at the same time or in an arbitrary order.

The operation information performed in a period in which the special direction mark overlaps the reference mark is acquired (step S103). Specifically, when the player operates the operation section 160 according to the direction of the special direction mark displayed by the movement display processing in the step S102, data for the calculation processing of the mini-game such as the operation timing, number of operations, operation period, or operation strength of the operation performed by the player (operation data for the mini-game in a broad sense) is sampled in frame units, and retained in the operation data storage buffer, for example. In this case, when the calculation processing is performed in the mini-game using the operation timing, the operation timing acquired in the step S7 shown in FIG. 19 may be used as the operation data for the mini-game.

Comparison processing between the acquired operation information and the mini-game criteria is performed (step S104). When a slot game using the operation timing as the operation information is used as the mini-game, the criterion data shown in FIGS. 7A to 7D is read from the criterion data storage section 176, and compared with the operation timing performed for the special direction mark.

The result of comparison performed in the step S104 is displayed on the mini-game image (step S105). In the case of the slot game described with reference to FIGS. 6A and 6B, a displayed symbol is displayed on the slot image.

Processing of generating special production in the music game based on the result of the mini-game is optionally performed (step S106), and the mini-game processing is terminated. In more detail, processing of adding (or subtracting) bonus points or the like is performed as described with reference to FIG. 6B, for example. In addition, output of special game sound differing from normal game sound, production which hinders the competitor in the case of a competition play, or the like is performed.

The mini-game processing may be terminated when the player operates the operation section for the special direction mark and the result of comparison based on the operation information is displayed, or may be terminated after causing the judgment result to be reflected in the music game as special production, or may be terminated on condition that a predetermined time (time limit) has elapsed after the start of the mini-game processing (or start of display of the mini-game image, or start of display of the special direction mark). Since a player must perform an operation for the mini-game within the time limit by providing the time limit as the mini-game finish condition, playability of the mini-game can be increased. As the end of the time limit, the end of the operation acceptance period of the special direction mark (when the special direction mark has passed the reference mark), or the time at which the operation acceptance period of the direction mark subsequent to the special direction mark is started may be employed.

Any term (such as music game, mini-game, criteria of operation timing for direction mark DM, or criteria of operation timing for special direction mark SM) cited with a different term having broader or the same meaning (such as first game, second game, first timing criteria or second timing criteria) at least once in this specification or drawings can be replaced by the different term in any place in this specification and drawings.

The present invention is suitable for a music game using an operation section which imitates the shape of a percussion instrument as shown in FIG. 1. However, the present invention may be applied to a music game using a musical instrument other than the percussion instrument. The present invention may also be applied to a music game without using a musical instrument.

As the mini-game for which the calculation processing is performed as the game differing from the music game, various games in which operation input for the mini-game can be completed within the operation acceptance period of the special direction mark, such as a batting game, a shooting game, a tree-climbing game, a hole-digging game, and a marathon game, can be employed.

The present invention may be applied to various image generation systems (game systems) such as an arcade game system, consumer game system, large-scale attraction system in which a number of players participate, simulator, multimedia terminal, or portable telephone.

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A computer-readable medium having a computer-executable program stored thereon for a game in which a player plays by operating an operation section, the program causing a computer to function as:

a music reproduction section which reproduces given music data stored in a storage section;

a display control section which performs display control of changing a relative positional relationship between a direction mark which directs an operation to be performed by a player using an operation section and a reference mark for timing judgment of the operation in association with a reproduction state of the music data to cause the direction mark and the reference mark to come closer;

a timing acquisition section which acquires operation timing when the player operates the operation section for the direction mark; and a game calculation section which performs calculation processing of a first game of comparing the acquired operation timing with timing criteria and calculation processing of a second game, the timing criteria of the first game being different from the timing criteria of the second game, wherein the display control section performs control of displaying a special direction mark for the second game as at least one of the direction marks, and wherein, when an operation of the operation section has been performed within a period in which the special direction mark overlaps the reference mark, the game calculation section performs the calculation processing of the second game based on operation information of the operation section for the special direction mark.

2. The computer-readable medium as defined in claim 1, wherein the game calculation section performs the calculation processing of the second game based on the operation timing of the operation section as the operation information of the operation section for the special direction mark.

3. The computer-readable medium as defined in claim 1, wherein the game calculation section performs the calculation processing of the first game by comparing the operation timing of the operation section for the special direction mark with the timing criteria.

4. The computer-readable medium as defined in claim 3, wherein the game calculation section performs the calculation processing of the first game by comparing the operation timing of the operation section for the special direction mark with first timing criteria, and performs the calculation processing of the second game by comparing the operation timing with second timing criteria differing from the first timing criteria.

5. The computer-readable medium as defined in claim 1, wherein the game calculation section performs processing of causing a result of the calculation processing of the second game to be reflected in the first game by performing special production corresponding to the result of the second game for the first game.

6. The computer-readable medium as defined in claim 1, wherein the game calculation section performs the calculation processing of the second game based on the operation information of the operation section for the special direction mark, and wherein the operation information is a number of operations, an operation period, or an operation strength of the operation section.

7. The computer-readable medium as defined in claim 1, wherein the display control section performs control of displaying a game content of the second game on the special direction mark.

8. The computer-readable medium as defined in claim 7, wherein, when the game calculation section has performed the calculation processing of the second game based on the operation timing of the operation section, the display control section performs control of displaying a result of the calculation processing of the second game on the special direction mark.

9. The computer-readable medium as defined in claim 1, wherein, when the operation section has been operated for all of a plurality of the special direction marks, the game calculation section performs processing of causing a result of the calculation processing of the second game to be reflected in the first game.

10. The computer-readable medium as defined in claim 1, wherein the display control section performs control of displaying the special direction mark corresponding to a progress state of the first game.

11. The computer-readable medium as defined in claim 1, wherein the display control section performs control of displaying a game start direction mark for allowing the second game to be performed by causing the special direction mark to appear as at least one of the direction marks.

12. The computer-readable medium as defined in claim 1, wherein the game calculation section causes an acceptance period for an operation input for the second game to be started on condition that a predetermined operation using the operation section has been performed within a period in which the special direction mark overlaps the reference mark, and performs the calculation processing of the second game based on the operation information of the operation section within the acceptance period.

13. The computer-readable medium as defined in claim 1, wherein the first game is a competition game in which a plurality of players compete for a comparison result between the operation timing of the operation section and the timing criteria; and wherein, when a given player has performed an operation of the operation section for the special direction mark, the game calculation section performs processing of causing a result of the calculation processing of the second game based on the operation information performed by the player to be reflected in the first game performed by another player.

14. The computer-readable medium as defined in claim 1, wherein the first game is a competition game in which a plurality of players compete for a comparison result between the operation timing of the operation section and the timing criteria;

wherein the computer is caused to function as a monitoring section which monitors a competition state of the first game between or among the plurality of players; and wherein, when the monitoring section judges that a given player is in a disadvantageous competition state in comparison with another player, the display control section performs control of displaying the special direction mark for the player in the disadvantageous competition state.

15. The computer-readable medium as defined in claim 1, wherein the first game is a competition game in which a plurality of players compete for a comparison result between the operation timing of the operation section and the timing criteria;

wherein the computer is caused to function as a condition judgment section which judges whether the operation information of the operation section for the special direction mark satisfies a predetermined condition of the second game; and wherein, when the condition judgment section has judged that the operation information of the operation section of a given player for the special direction mark does not satisfy the predetermined condition of the second game, the display control section performs control of displaying the special direction mark for another player.

16. A computer-readable medium having a computer-executable program stored thereon for a percussion instrument game in which a player plays by performing an operation of beating a percussion instrument type controller, the program causing a computer to function as:

a music reproduction section which reproduces music data for playing a percussion instrument which is stored in a storage section;

a display control section which performs display control of changing a relative positional relationship between a direction mark which directs a beat operation to be performed by a player using a percussion instrument type controller and a reference mark for timing judgment of the beat operation in association with a reproduction state of the music data to cause the direction mark and the reference mark to come closer;

a timing acquisition section which acquires beat timing when the player performs the beat operation of the percussion instrument type controller for the direction mark; and a game calculation section which performs calculation processing of a first game of comparing the acquired beat timing with timing criteria and evaluating the beat operation of the player, and calculation processing of a second game, the timing criteria of the first game being different from the timing criteria of the second game, wherein the display control section performs control of displaying a special direction mark for the second game as at least one of the direction marks, wherein, when an operation of the percussion instrument type controller has been performed within a period in which the special direction mark overlaps the reference mark, the game calculation section performs the calculation processing of the second game based on the beat timing of the percussion instrument type controller for the special direction mark, and wherein the game calculation section performs processing of causing a result of the calculation processing of the second game to be reflected in the first game by performing special production for the first game.

17. A game method for a game in which a player plays by operating an operation section, the method comprising:

reproducing given music data stored in a storage section;

performing display control of changing a relative positional relationship between a direction mark which directs an operation to be performed by a player using an operation section and a reference mark for timing judgment of the operation in association with a reproduction state of the music data to cause the direction mark and the reference mark to come closer;

acquiring operation timing when the player operates the operation section for the direction mark;

performing calculation processing of a first game of comparing the acquired operation timing with timing criteria and calculation processing of a second game, the timing criteria of the first game being different from the timing criteria of the second game;

performing control of displaying a special direction mark for the second game as at least one of the direction marks; and performing the calculation processing of the second game based on operation information of the operation section for the special direction mark, when an operation of the operation section has been performed within a period in which the special direction mark overlaps the reference mark.

18. A game method for a percussion instrument game in which a player plays by performing an operation of beating a percussion instrument type controller, the method comprising:

reproducing music data for playing a percussion instrument which is stored in a storage section;

performing display control of changing a relative positional relationship between a direction mark which directs a beat operation to be performed by a player using a percussion instrument type controller and a reference mark for timing judgment of the beat operation in association with a reproduction state of the music data to cause the direction mark and the reference mark to come closer;

acquiring beat timing when the player performs the beat operation of the percussion instrument type controller for the direction mark;

performing calculation processing of a first game of comparing the acquired beat timing with timing criteria and evaluating the beat operation of the player, and calculation processing of a second game, the timing criteria of the first game being different from the timing criteria of the second game;

performing control of displaying a special direction mark for the second game as at least one of the direction marks;

performing the calculation processing of the second game based on the beat timing of the percussion instrument type controller for the special direction mark, when an operation of the percussion instrument type controller has been performed within a period in which the special direction mark overlaps the reference mark; and performing processing of causing a result of the calculation processing of the second game to be reflected in the first game by performing special production for the first game.

* * * * *